(12) United States Patent
Park et al.

(10) Patent No.: US 9,730,187 B2
(45) Date of Patent: Aug. 8, 2017

(54) APPARATUS AND METHOD FOR DISTRIBUTED SCHEDULING IN WIRELESS COMMUNICATION SYSTEM

(71) Applicant: Samsung Electronics Co., Ltd, Gyeonggi-do (KR)

(72) Inventors: Seung-Hoon Park, Seoul (KR);
Kyung-Kyu Kim, Gyeonggi-do (KR);
Dae-Gyun Kim, Gyeonggi-do (KR);
Hyun-Seok Ryu, Gyeonggi-do (KR);
Young-Joong Mok, Gyeonggi-do (KR);
Sang-Kyu Baek, Gyeonggi-do (KR);
Chi-Woo Lim, Gyeonggi-do (KR);
Young-Bin Chang, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 17 days.

(21) Appl. No.: 14/904,645

(22) PCT Filed: Jul. 14, 2014

(86) PCT No.: PCT/KR2014/006325
§ 371 (c)(1),
(2) Date: Jan. 12, 2016

(87) PCT Pub. No.: WO2015/005745
PCT Pub. Date: Jan. 15, 2015

(65) Prior Publication Data
US 2016/0183286 A1 Jun. 23, 2016

(30) Foreign Application Priority Data

Jul. 12, 2013 (KR) .................. 10-2013-0082487
Nov. 7, 2013 (KR) .................. 10-2013-0134864

(51) Int. Cl.
H04W 72/02 (2009.01)
H04W 72/04 (2009.01)
H04W 72/12 (2009.01)

(52) U.S. Cl.
CPC ......... *H04W 72/02* (2013.01); *H04W 72/042* (2013.01); *H04W 72/0413* (2013.01); *H04W 72/1257* (2013.01)

(58) Field of Classification Search
None
See application file for complete search history.

(56) References Cited

U.S. PATENT DOCUMENTS 7,979,075 B2 * 7/2011 Cheng .................. H04L 1/0026
370/328
9,509,463 B2 * 11/2016 Bao ....................... H04L 1/0026
(Continued)

FOREIGN PATENT DOCUMENTS

WO WO 2012/159270 A1 11/2012

OTHER PUBLICATIONS

International Search Report dated Oct. 15, 2014 in connection with International Patent Application No. PCT/KR2014/006325, 3 pages.
(Continued)

*Primary Examiner* — Hong Cho

(57) ABSTRACT

An apparatus is configured to perform a method for performing distributed scheduling by a reception device configuring a target link corresponding to one of a plurality of links in a network in which the plurality of links for device to device communication exist. The method includes adding up resource allocation demand amounts included in resource information broadcasted by a counterpart device configuring the target link and one or more adjacent transmission devices by a preset Resource Unit (RU), and adjusting self resource information in consideration of resource position informa-
(Continued)

tion included in the broadcasted resource information and the added resource allocation demand amount and transmitting the adjusted self resource information to the counterpart transmission device.

20 Claims, 17 Drawing Sheets

(56) References Cited

U.S. PATENT DOCUMENTS

| | | |
|---|---|---|
| 2010/0151897 A1 | 6/2010 | Li et al. |
| 2011/0096740 A1* | 4/2011 | Kim .................... H04W 72/085 370/329 |
| 2011/0282989 A1 | 11/2011 | Geirhofer et al. |
| 2011/0312331 A1 | 12/2011 | Hakola et al. |
| 2013/0083779 A1 | 4/2013 | Ahn et al. |
| 2013/0128858 A1 | 5/2013 | Zou et al. |

OTHER PUBLICATIONS

Written Opinion of the International Searching Authority dated Oct. 15, 2014 in connection with International Patent Application No. PCT/KR2014/006325, 5 pages.

* cited by examiner

APPARATUS AND METHOD FOR DISTRIBUTED SCHEDULING IN WIRELESS COMMUNICATION SYSTEM

CROSS-REFERENCE TO RELATED APPLICATION(S)

The present application claims priority under 35 U.S.C. §365 to International Patent Application No. PCT/KR2014/006325 filed Jul. 14, 2014, entitled "APPARATUS AND METHOD FOR DISTRIBUTED SCHEDULING IN WIRELESS COMMUNICATION SYSTEM ", and, through International Patent Application No. PCT/KR2014/006325, to Korean Application No. 10-2013-0082487 filed Jul. 12, 2013, and Korean Application No. 10-20130134864 filed Nov. 7, 2013, each of which are incorporated herein by reference into the present disclosure as if fully set forth herein.

TECHNICAL FIELD

The present disclosure relates to an apparatus and a method for scheduling resources in a wireless communication system supporting Device to Device (D2D) communication (hereinafter, referred to as a "D2D communication system").

BACKGROUND ART

The current propagation of wireless devices such as smart phones and various applications are causing an increase in data traffic on wireless networks.

In addition, wireless intelligence communication such as communication between individual devices such as smart TVs, refrigerators and the like other than smart phones may too increase traffic in the wireless network to levels that are difficult to handle.

The D2D communication is highlighted as one alternative to process traffic in wireless networks while not burdening an evolved Node B (eNB). The D2D communication can use a frequency band which is not allowed like a WLAN as well as a frequency band which is allowed to perform wireless communication.

The D2D communication in the allowed frequency band can reduce the load on the eNB. This may allow the eNB to efficiently use limited traffic capacities (acceptable traffic capacities) which the eNB can accept.

For example, User Equipments (UEs) within the same cell or adjacent cells may configure a communication link for D2D communication (hereinafter, referred to as a "D2D link") in a mobile communication system supporting communication in the allowed frequency band. The UEs can directly exchange data through the configured D2D link without depending on the eNB. Through the D2D communication, it is possible to reduce the number of required links as compared to a case using the eNB. The eNB can use the left over links for other purposes due to the decrease in the number of links.

The D2D communication in the non-allowed frequency band may prevent radio resources from being unnecessarily wasted. Further, it may provide an efficient service for traffic locally generated.

The D2D communication requires discovery, pairing, scheduling and the like after synchronization between devices. The discovery corresponds to an operation in which a device identifies adjacent devices through device identification information broadcasted by other adjacent devices. The pairing corresponds to an operation in which a device configures a D2D link with an adjacent device. The scheduling corresponds to an operation in which devices having the configured D2D link receive resources for the D2D communication.

In general, a network supporting Ad-hoc/sensor communication (hereinafter, referred to as an "Ad-hoc/sensor network") allocates resources by using a contention-based resource accessing scheme. A Carrier Sense Multiple Access with Collision Avoidance (CSMA-CA) scheme is an example of the contention-based resource accessing scheme. When the number of UEs is small in the network, the CSMA-CA scheme can transmit/receive data while avoiding collision without separate complicated management by the network.

The Ad-hoc/sensor network has a problem in that a transmission rate become low in a region where the number of users is large. Accordingly, in consideration of a wireless communication environment in which the number of users is expected to increase, an improved scheduling scheme should be provided.

A network supporting the D2D communication (hereinafter, referred to as a "D2D network") allocates resources by using a "FlashLinQ scheme".

The FlashLinQ scheme has been designed for the D2D communication. The FlashLinQ scheme defines a slot like a Time Division Multiple Access (TDMA) scheme for efficiency. The FlashLinQ scheme has no master node which manages the resource allocation. Accordingly, the FlashLinQ scheme allocates slot resources by using a round robin scheme.

The FlashLinQ scheme suggests transforming Request To Send (RTS) and Clear To Send (CTS) control signals used in the CSMA-CA scheme and using them for accessing the resources in the TDMA scheme. The FlashLinQ scheme has been made based on Signal to Interference Radio (SIR) measurement using the RTS and CTS in Wi-Fi. The FlashLinQ scheme is implemented to operate based on an Orthogonal Frequency Division Multiplexing (OFDM) scheme in a synchronized network. Accordingly, the FlashLinQ scheme may obtain favorable capability in comparison with conventional Wi-Fi in a particular environment.

The FlashLinQ scheme allocates a priority to each link and measures interference from a higher link and signal power of its own link, so as to calculate the SIR. The FlashLinQ scheme may simultaneously perform transmission when the calculated SIR is higher than a target threshold. The FlashLinQ scheme may simultaneously perform transmission when the SIR is higher than a target threshold in consideration of interference provided to a higher link by its own link.

The FlashLinQ scheme determines resource allocation and priority according to the round robin scheme. For example, one link is selected according to the priority and a next priority link is selected in consideration of interference with the selected link. Accordingly, the number of links to be simultaneously transmitted is secured. The FlashLinQ scheme shuffles the priorities whenever every resource is determined. This makes all D2D links uniformly receive a transmission chance.

The FlashLinQ scheme has difficulty in efficiently allocating resources in comparison with a scheme considering interference information in the network. This is because a transmitted link is changed whenever the priority is changed. That is, the FlashLinQ scheme cannot use channel information measured in consideration of interference from the previous resource for scheduling.

Since the FlashLinQ scheme depends on a control signal transmitted by a higher link, when interference given from its own link to a higher link is calculated, interference given to the higher link by another link other than its own link cannot be recognized. That is, one device has difficulty in recognizing channel information on adjacent devices in the D2D network, so that the device cannot help but allocate resources depending on partial channel information in D2D communication.

When the device can perform scheduling in the D2D network in consideration of channel information of an adjacent device, that is, an adjacent D2D link, it is possible to allocate resources to secure the maximum capacity.

DISCLOSURE OF INVENTION

Technical Problem

An embodiment of the present disclosure provides an apparatus and a method for efficiently allocating resources through distributed scheduling in a D2D communication system.

An embodiment of the present disclosure provides an apparatus and a method for performing distributed scheduling in consideration of resource information collected for an adjacent D2D link in a D2D communication system.

An embodiment of the present disclosure provides an apparatus and a method for allocating resources which obtain optimal capacity while minimizing influence by interference based on distributed scheduling in a D2D communication system.

An embodiment of the present disclosure provides an apparatus and a method for minimizing overhead due to a control signal when resources are allocated based on distributed scheduling in a D2D communication system.

An embodiment of the present disclosure provides an apparatus and a method for determining a resource allocation position or a resource allocation amount by using channel information reflecting interference shared between adjacent devices to perform scheduling for data transmission in a D2D communication system.

An embodiment of the present disclosure provides an apparatus and a method for repeatedly performing an operation of changing a position or an amount of a resource to be allocated by allowing an adjacent device to share resource information which a transmission device transmits to a reception device in a D2D communication system.

An embodiment of the present disclosure provides an apparatus and a method in which a reception device measures a channel status by pilot signals provided from a plurality of adjacent transmission devices and reports the measured channel status to the plurality of adjacent transmission devices in a D2D communication system.

An embodiment of the present disclosure provides an apparatus and a method in which a transmission device reflects a channel status reported by a reception device when resource information is changed in a D2D communication system.

Solution to Problem

In accordance with an aspect of the present disclosure, a method of performing distributed scheduling by a reception device configuring a target link corresponding to one of a plurality of links in a network in which the plurality of links for device to device communication exist is provided. The method includes: adding up resource allocation demand amounts included in resource information broadcasted by a counterpart device configuring the target link and one or more adjacent transmission devices by a preset Resource Unit (RU); adjusting self resource information in consideration of resource position information included in the broadcasted resource information and the added resource allocation demand amount and transmitting the adjusted self resource information to the counterpart transmission device; measuring channel quality by a pilot signal received from the counterpart transmission device until data transmission using resources determined based on a predetermined distributed scheduling rule of the broadcasted resource information is performed; and feeding back channel quality information according to the measurement to the counterpart transmission device.

In accordance with another aspect of the present disclosure, a reception device configuring a target link corresponding to one of a plurality of links in a network in which the plurality of link for device to device communication exist and performing distributed scheduling for allocating resources to be used for transmitting data through a session in the configured target link is provided. The reception device includes: a receiver that receives resource information broadcasted by a counterpart transmission device configuring the target link and one or more adjacent transmission devices; a controller that adjusts self resource information in consideration of resource position information included in the broadcasted resource information and an added resource allocation demand amount, adds up resource allocation demand amounts included in the broadcasted resource information by a preset Resource Unit (RU), and measures channel quality by a pilot signal received from the counterpart transmission device until data transmission using resources determined based on a predetermined distributed scheduling rule of the broadcasted resource information is performed; and a transmitter that transmits the adjusted resource information to the counterpart transmission device and feeds back channel quality information according to the measurement to the counterpart transmission device.

In accordance with another aspect of the present disclosure, a method of performing distributed scheduling by a transmission device configuring a target link corresponding to one of a plurality of links in a network in which the plurality of links for device to device communication exist is provided. The method includes: broadcasting resource information configured for the target link; receiving resource information adjusted by a counterpart reception device configuring the target link; transmitting a pilot signal and data based on the resource information configured for the target link; receiving channel quality information corresponding to the transmitted pilot signal from the counterpart reception device; when data transmission using allocated resources is completed, determining a resource allocation demand amount for next device to device communication in consideration of the received channel quality information; when the data transmission using the allocated resources is completed, updating a resource allocation start position for the next device to device communication by the received adjusted resource information; and broadcasting resource information including the determined resource allocation demand amount, the updated resource allocation start position, and identification information of a link for performing the next device to device communication.

In accordance with another aspect of the present disclosure, a transmission device configuring a target link corresponding to one of a plurality of links in a network in which the plurality of link for device to device communication exist and performing distributed scheduling for allocating resources to be used for transmitting data through a session in the configured target link is provided. The transmission device includes: a transmitter that broadcasts resource information configured for the target link and transmits a pilot signal and data based on the resource information configured for the target link; a receiver that receives resource information adjusted by a counterpart reception device configuring the target link and receives channel quality information corresponding to the transmitted pilot signal from the counterpart reception device; and a controller that, when data transmission using allocated resources is completed, determines a resource allocation demand amount for next device to device communication in consideration of the received channel quality information, updates a resource allocation start position for the next device to device communication by the received adjusted resource information, and broadcasts resource information including the determined resource allocation demand amount, the updated resource allocation start position, and identification information of a link for performing the next device to device communication.

BRIEF DESCRIPTION OF DRAWINGS

The above and other aspects, features, and advantages of the present disclosure will be more apparent from the following detailed description taken in conjunction with the accompanying drawings, in which.

MODE FOR THE INVENTION

Figure 1:
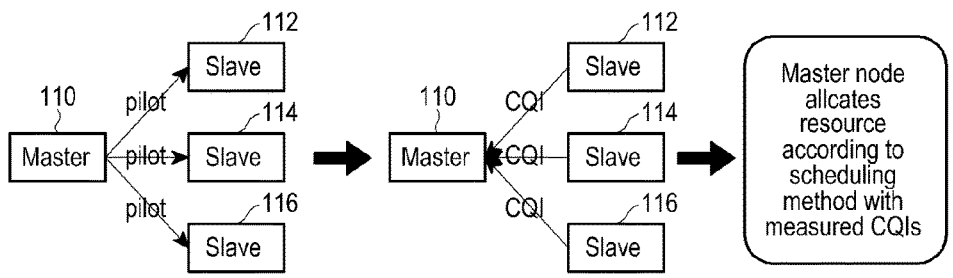
FIG. 1 illustrates an example of resource allocation performed in a network having a general master-slave structure.

Hereinafter, exemplary embodiments according to the present disclosure will be disclosed to solve the technical problems. Further, the same names of entities defined for the convenience of descriptions of the present disclosure may be used. However, the names used for the convenience of the descriptions do not limit the scope of the present disclosure, and may be applied to a system having a similar technical background through the same or easy modification.

Further, in the following description, a detailed description of known configurations or functions incorporated herein will be omitted when it is determined that the detailed description may make the subject matter of the present disclosure unclear.

The detailed description described below will be made based on a D2D network. However, a function and a configuration corresponding to a technical feature disclosed herein should not be construed as being applied only to the D2D network. That is, the function and the configuration corresponding to the technical feature disclosed in the detailed description may be equally applied to other types of communication schemes as well as the device to device communication.

In the following description, in a wireless environment where a plurality of D2D links are adjacently located, resource information is exchanged between the plurality of adjacent D2D links and use resources are determined to avoid collision based on the exchanged resource information. A process of repeatedly performing a data transmission operation in each D2D link by using the determined use resources will be described as the technical feature. The repeatedly performed data transmission operation may improve the scheduling capability.

A scheduling scheme of transmitting/receiving information for allocating resources between devices in the D2D system suggests determining one of a resource allocation start position (RUstart) and a resource allocation demand amount (RUdemand). To this end, it is required that resources are shared between devices.

In the following description, a scheduling scheme for avoiding the collision of resources to be allocated to respective D2D links will be provided. Adjacent devices share resource information. Based on the shared resource information, a transmission device and a reception device repeatedly perform an operation of negotiating at least one of a position and an amount of resources to be allocated. Such a scheduling scheme minimizes an influence by interference.

For example, a transmission device configuring a D2D link broadcasts a resource information request message (TxD Request message) to a counterpart reception device and one or more adjacent reception devices. The transmission device receives a resource information response message (RxD Response message) from the counterpart reception device. The transmission device determines a start index of Resource Units (RUs) allocated as initial resources or determines a next start index by adjusted resource information included in the resource information response message. The transmission device starts data transmission in the determined start index and maintains the data transmission in consecutive RUs until the allocated resources are all consumed. The RUs to maintain the data transmission may be logically consecutive RUs. For example, even though logically consecutive RUs are allocated, actual physical resources may be nonconsecutively mapped.

The transmission device transmits pilot signals such that the counterpart reception device and one or more adjacent reception devices can receive the pilot signals. The transmission device receives Channel Quality Information (CQI) measured by the pilot signal from the counterpart reception device to reflect the CQI in an update of the allocated resources. The CQI may be measured by the pilot signal transmitted by a counterpart transmission device and/or an adjacent transmission device.

The reception device receives a self resource information request message broadcasted by the counterpart transmission device and a neighboring resource information request message broadcasted by one or more adjacent transmission devices. The reception device adjusts resource information based on self resource information included in the received self resource information request message and neighboring resource information included in the received neighboring resource information request message. The reception device transmits a resource information response message including the adjusted resource information to the counterpart transmission device. The reception device receives the adjusted resource information provided from the counterpart transmission device or data on resource units allocated by self resource information transmitted by the counterpart transmission device.

The reception device measures the channel quality of a downlink by the pilot signals received from the counterpart transmission device and one or more adjacent transmission devices and reports CQI according to the measured channel quality to the counterpart transmission device.

In the following description, for convenience of the description, the transmission device configuring the D2D link is referred to as a "transmission device" and the reception device configuring the D2D link is referred to as a "reception device".

In the following description, scheduling for the resource allocation is performed in consideration of congestion of the D2D network due to increases in D2D links subject to the scheduling. For example, the reception device measures congestion by using at least one of a reception power strength or a resource demand amount in a slot corresponding to a start position of the allocated resources configured by the adjacent transmission device and re-configures a start position of the allocated resources when the measured congestion exceeds a predetermined reference.

According to distributed scheduling for the resource allocation to be provided, the device transmits self resource information for transmitting data based on the D2D communication to the counterpart device. The resource information includes a resource allocation start position (RUstart) and a resource allocation demand amount (RUdemand). The resource allocation start position (RUstart) corresponds to a start position of RUs allocated as resources for data transmission. The resource allocation demand amount (RUdemand) indicates an amount of allocated resources (for example, the number of allocated RUs). The resources may be allocated in various forms of time, frequency, code, space and the like. For example, when the resources are allocated in the unit of slots, resource information may include at least one of a slot index (RUstart) indicating a start position of a slot and the number of slots (RUdemand).

Hereinafter, embodiments of the present disclosure will be described with reference to the accompanying drawings in detail.

FIG. 1 illustrates an example of resource allocation performed in a network having a general master-slave structure.

Referring to FIG. 1, a master device 110 transmits pilot signals to a plurality of slave devices 112, 114, and 116. The pilot signal may be used to measure a channel status of the downlink. For example, the master device 110 transmits the pilot signals to an unspecified multitude of slave devices, not a particular slave device.

The plurality of slave devices 112, 114, and 116 receive the pilot signals transmitted from the master device 110. Each of the plurality of slave devices 112, 114, and 116 measures a channel status of the downlink based on a reception signal intensity of the pilot signal. Each of the plurality of slave devices 112, 114, and 116 configures CQI based on the measured channel status and reports the configured CQI to the master device 110.

The master device 110 allocates resources to the plurality of slave devices 112, 114, and 116 based on the CQI reported by the plurality of slave devices 112, 114, and 116.

According to the above description, in the network having the master-slave structure, one master device identifies channel statuses of a plurality of slave devices and allocates resources to the respective slave devices based on the channel statuses. Such resource allocation enables the efficient use of resources.

However, in a network supporting communication between a plurality of transmission devices and a plurality of reception devices, structurally, the transmission device identifies channel statuses of all the reception devices and has difficulty in allocating resources based on the channel statuses. The D2D network may be one example of the networks supporting communication between a plurality of transmission devices and a plurality of reception devices.

Figure 2:
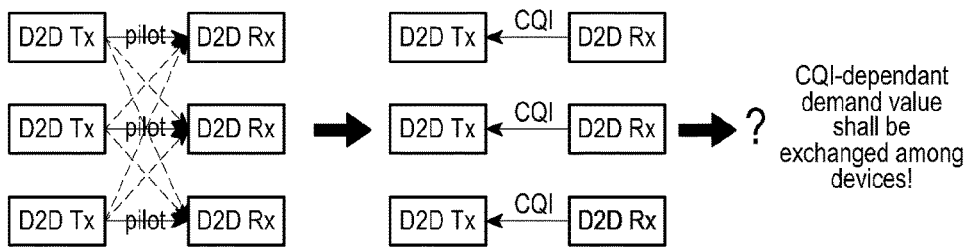
FIG. 2 shows the difficulty that each reception device experiences when allocating resources in consideration of channel statuses of all reception devices in a general D2D network.

FIG. 2 shows the difficulty that the reception device experiences when allocating resources in consideration of channel statuses of all reception devices in the D2D network.

Referring to FIG. 2, the pilot signal is transmitted by each of a plurality of transmission devices for channel measurement. The pilot signal will be received by an unspecified multitude of reception devices.

The reception device may receive the pilot signal transmitted by the counterpart transmission device to measure a channel status. The counterpart transmission device is a device with which the reception device desires to directly communicate. Since the transmission device allocates resources in an individual link, it is difficult to allocate resources in consideration of channel statuses of entire links like in the master-slave structure.

In the D2D network, a link is independently configured between the reception device and the transmission device. When it is possible to share channel statuses of adjacent links in the D2D network, the channel statuses of the adjacent links can be considered when resources are allocated. Accordingly, in the D2D network, the use efficiency of resources can be improved.

Figure 3:
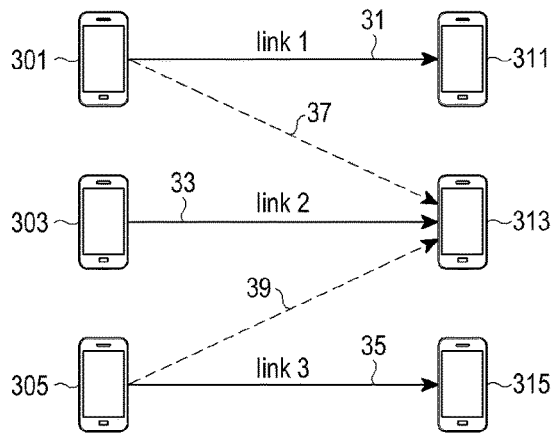
FIG. 3 illustrates an example of a signal and an interference relation between devices configuring a plurality of links for scheduling in a D2D communication system according to an embodiment of the present disclosure.

FIG. 3 illustrates that devices configuring a plurality of links for scheduling share resource information in the D2D communication system according to an embodiment of the present disclosure.

Referring to FIG. 3, a plurality of devices 301, 303, 305, 311, 313, and 315 are D2D devices. The D2D devices can perform direct communication with another device without involvement of the eNB.

Each of the plurality of devices 301, 303, 305, 311, 313, and 315 broadcasts self identification information. Each of the plurality of devices 301, 303, 305, 311, 313, and 315 may recognize adjacent devices through discovery using identification information broadcasted by another device.

Each of the plurality of devices 301, 303, 305, 311, 313, and 315 configures a link with an adjacent device recognized by a pairing process. The discovery process and the pairing process are suggested for the D2D communication.

In FIG. 3, it is assumed as an example that three links are configured by six devices 301, 303, 305, 311, 313, and 315. Each of the three links is configured by one transmission device and one reception device. The six devices 301, 303, 305, 311, 313, and 315 include three devices 301, 303, and 305 corresponding to transmission devices and three devices 311, 313, and 315 corresponding to reception devices.

For example, the first device 301 configures a first link 31 for D2D communication with the first reception device 311. The second device 303 configures a second link 33 for D2D communication with the second reception device 313. The third device 305 configures a third link 35 for D2D communication with the third reception device 315.

Hereinafter, for convenience of the description, another device with which one device configures a link is referred to as a "counterpart device" and a device configuring an adjacent link is referred to as an "adjacent device". For example, with respect to the second reception device 313, a counterpart device is the second transmission device 303 and adjacent devices are the first and third transmission devices 301 and 305.

Each of the transmission devices 301, 303, and 305 broadcasts resource information for data transmission. Each of the reception devices 311, 313, and 315 receives resource information of one or more transmission devices.

For example, the second reception device 313 receives resource information broadcasted from the second transmission device 303 corresponding to the counterpart device (hereinafter, referred to as a "counterpart transmission device"). The second reception device 313 also receives resource information 37 and 39 broadcasted from the adjacent devices, that is, the transmission devices 301 and 305.

The second reception device 313 can collect resource information 37 and 39 of the adjacent transmission devices 301 and 305 as well as resource information of the counterpart transmission device 303. This prevents resources to be allocated to the second link 33 from colliding resources allocated to the first link 31 and the third link 35.

For example, the second reception device 313 may correct self resource information based on the self resource information and neighboring resource information. The self resource information is resource information collected for the configured second link 33 and the neighboring resource information is resource information collected for the first link 31 and the third link 35 corresponding to the adjacent links.

The second reception device 313 can schedule self resource information in consideration of neighboring resource information. The second reception device 313 provides corrected self resource information (that is, modified scheduling information) to the counterpart transmission device 303. The resource information may be transmitted through a separate control channel.

Figure 4:
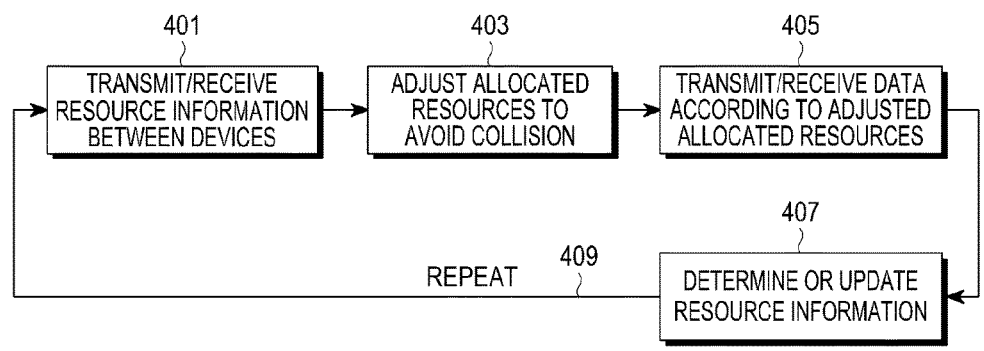
FIG. 4 illustrates sequential processes for distributed scheduling of resources in a D2D communication system according to an embodiment of the present disclosure.

FIG. 4 illustrates sequential processes for distributed scheduling of resources in a D2D communication system according to an embodiment of the present disclosure.

Referring to FIG. 4, each device may operate as a transmission device in any link or as a reception device in another link. However, due to the restriction of a half duplex mode in actual D2D communication, one device may be considered as operating as only one of the transmission device or the reception device.

The transmission device repeatedly performs a data transmission process for the distributed scheduling of resources. The data transmission process repeatedly performed by the transmission device may improve the scheduling capability for resource allocation. This is because the data transmission process includes an operation of collecting resource information of adjacent links (neighboring resource information) and updating self resource information in consideration of the collected neighboring resource information. That is, the resource allocation can be performed by the scheduling reflecting a channel status which is changed due to interference between devices.

The device exchanges resource information with other devices to perform D2D communication in step 401. The resource information is information on resources requested to be allocated for the D2D communication. Other devices refer to adjacent devices including a counterpart device to perform the D2D communication.

For example, the device which desires to perform the D2D communication broadcasts self resource information and receives neighboring resource information. The self resource information is resource information for a link which the device configures to perform the D2D communication. The neighboring resource information is resource information for links which other adjacent devices except for the counterpart device configure to perform the D2D communication. Each device may collect only the self resource information but also the neighboring resource information. Accordingly, each device can share resource information with adjacent devices.

The resource information will be used for transmitting data in a corresponding link at a particular transmission time. The resource information may include a position of a slot (resource ID) to transmit data at a particular transmission time, a resource allocation start position (RUstart) to start data transmission, and a resource allocation demand amount (RUdemand).

Information on the position of the slot may be a position index indicating at least one slot allocated as resources to be used. The position index corresponds to resources for wireless communication which are logically divided. For example, the position index indicates a position of a slot using various resources divided according to time/frequency/space. In the following description, a case where an index of a slot is used to distinguish time resources will be described as a representative example. In this case, 16 time slots supporting a TDMA scheme may be distinguished using the slot index.

The resource allocation start position (RUstart) included in the resource information is a position index indicating a start slot of the slots allocated as use resources. The resource allocation demand amount (RUdemand) included in the resource information may be the number of slots to be used for data transmission. In the following description, it is assumed that both the resource allocation start position (RUstart) and the resource allocation demand amount (RUdemand) are used as resource information.

The device performs scheduling of allocating resources to support D2D communication based on collected self resource information and neighboring resource information. The scheduling should be performed in such a manner that collision with another link is not generated. For example, the device identifies resources requested to be allocated in one or more adjacent links based on the received neighboring resource information. The device performs scheduling for allocating resources to its own link in consideration of collision with resources requested to be allocated in the identified one or more adjacent links.

The device transmits self resource information adjusted by the scheduling to the counterpart device. The device may receive the self resource information adjusted by the scheduling from the counterpart device. The device may allocate resources to be used for D2D communication in its own link while avoiding collisions with resources of adjacent links.

The reception device provides the adjusted self resource information (that is, modified scheduling information) to the counterpart transmission device. The transmission device supports resource allocation to the corresponding D2D link based on the modified self resource information.

A plurality of transmission devices providing the resource information to the reception device include not only the counterpart transmission device but also one or more adjacent transmission devices.

The device performs an operation of determining allocated resources to avoid the collision and updating resource information to obtain more improved capability in the next scheduling. This allows resource information which the reception device will make a request for in the next scheduling based on resource information obtained for a surrounding situation to be determined or adjusted. The determination or adjustment of the resource information to be requested in the next scheduling may be distinguished from the adjustment of resource information to avoid the collision in this scheduling.

That is, the reception device collects self resource information and neighboring resource information from a plurality of transmission devices and adjusts the self resource information, that is, at least one of the resource allocation start position and the resource allocation demand amount by using the collected resource information (that is, scheduling information for resource allocation). The reception device adjusts the self resource information with reference to the neighboring resource information collected from the transmission device configuring one or more adjacent D2D links.

The device transmits/receives data to/from the counterpart device through the D2D link by using allocated resource or adjusted resources in step 405. However, the device may apply the resources allocated by the adjusted resource information directly to current transmission or to next transmission.

The device repeatedly performs the operation of adjusting the resources for the D2D link configured by the device by using the neighboring resource information and transmitting/receiving data by the D2D communication based on the adjusted resources in step 409. That is, the transmission device repeatedly performs the operation of receiving the self resource information adjusted by the counterpart reception device and transmitting data by the D2D communication based on the determined resources by using the received self resource information.

According to the above description, a plurality of devices performing the D2D communication can improve the D2D communication capability by avoiding using resources which may collide with other resources between D2D links. Further, it is possible to improve the D2D communication capability by repeatedly adjusting the resource information.

Although not illustrated in FIG. 4, the device transmits the pilot signal when transmitting data by using allocated resources. The device measures a channel status through the reception of pilot signals transmitted by adjacent devices as well as the counterpart device and provides CQI according to the measurement to the counterpart device.

The device may determine or update self resource information to be broadcasted next time based on the CQI received from the counterpart device or the CQI received from the counterpart device and the adjacent devices in step 407. For example, the device may determine a resource allocation demand amount (the number of slots requested to be allocated) of self resource information to be broadcasted, by using the collected CQI.

When the device operates as the reception device, the device may additionally provide information for informing of whether a next slot is allocated or not to the counterpart transmission device. Then, the counterpart transmission device determines whether to transmit data in the next slot according to the corresponding information.

As identified from the above described operation, when the transmission device has completed the collection of the neighboring resource information on one or more adjacent links, the transmission device determines resources to be used at a time point when the next data is transmitted in its own link. The determined resources may avoid collision with resources to be used by the adjacent devices. This is because the resources generating the collision due to the sharing of resource information with the adjacent devices can be predicted.

For example, a rule to not generate the collision of the resources with adjacent devices may be pre-determined. The pre-determined rule is a rule which allocates resources to be used in the next transmission based on the shared neighboring resource information. The transmission device may easily allocate resources by avoiding collisions according to the predetermined rule.

The transmission device transmits data to the reception device using the allocated resources. The used resources have already been determined to avoid collisions with the adjacent devices. Accordingly, it is possible to prevent the performance from deteriorating due to the use of the same resources in links supporting the D2D communication.

The transmission and reception devices repeatedly perform a process of transmitting data by adjusted resources based on neighboring resource information. The process of repeatedly transmitting the data by the transmission and reception devices can gradually improve the D2D communication performance.

The transmission device requires determining in advance a resource demand amount required for the repeatedly performed data transmitting process. The determined resource demand amount is transmitted to the reception device as the resource information.

For example, the reception device measures a channel status (channel characteristic) of the downlink by using the pilot signal received when the transmission device transmits the data. The reception device reports the measured channel status to the transmission device. Since the transmission devices simultaneously transmit pilot signals, the measured channel status reflects an adjacent interference situation. The transmission device may determine the number of resource slots required for the scheduling based on the measured channel status.

The transmission device determines a Proportional Fairness (PF) value by using the channel measurement result and converts the determined PF value to the number of resource slots to reflect the number of resource slots in resource information requested to the device. That is, when interference is very serious or transmission changes are small, the transmission device increases the PF value and thus makes the number of required resource slots increase.

For the provided embodiment, the value converted from the channel measurement result does not have to be the PF value. That is, the value converted from the channel measurement result may be a channel value itself or various types of value including the channel value.

Figure 5:
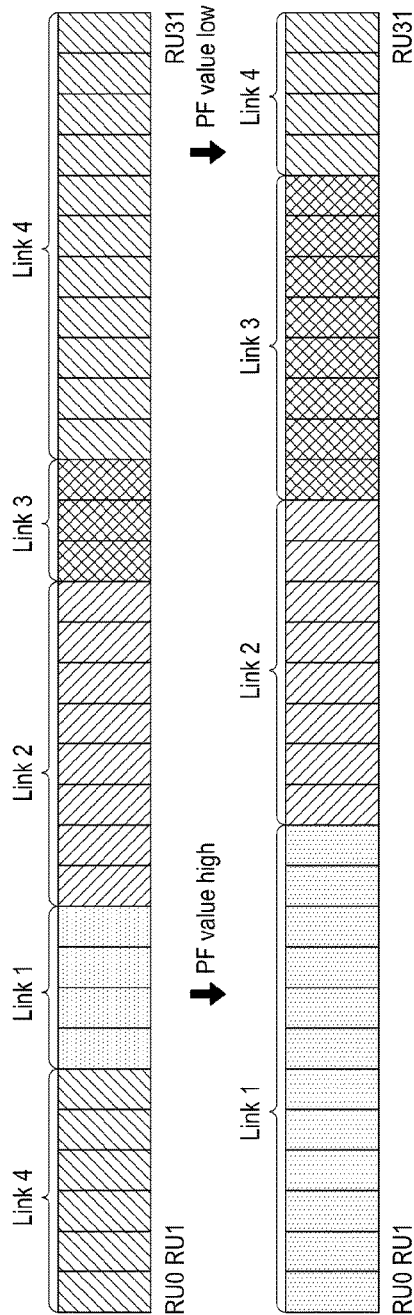
FIG. 5 illustrates an example of a change in slots allocated to each link supporting D2D communication in a wireless network according to an embodiment of the present disclosure.

FIG. 5 illustrates a change in a slot allocated to each link supporting D2D communication in a wireless network according to an embodiment of the present disclosure.

Referring to FIG. 5, since a PF value converted from a channel measurement result in a first link is "high", the number of slots allocated to the first link increases from four to twelve by the repetitive performance of a data transmission process. Since a PF value converted from a channel measurement result in link 4 is "low", the number of slots allocated to link 4 decreases from eleven to four by the repetitive performance of a data transmission process.

In FIG. 5, thirty two time slots are used for dividing time resources. The thirty two time slots are distinguished by slot indexes of RU0, RU1 . . . RU31.

In order to form a link supporting the maximum number of D2D communication within an area determined according to the above description, a method of spatially reusing resources should be provided. In one method, the relatively larger number of resources which can be independently used are allocated to a link having large interference from an adjacent link, as compared to resources which can be shared with another link. However, the relatively larger number of resources which can be shared with another link are allocated to a link having small interference from an adjacent link, as compared to resources which can be independently used.

Figure 6:
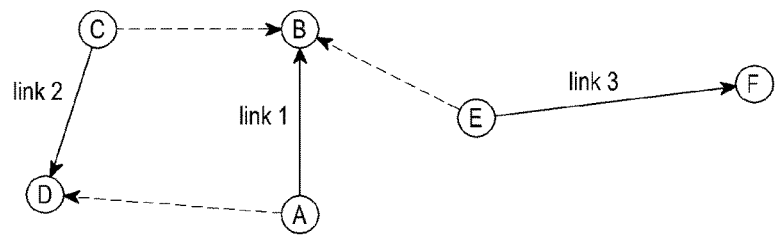
FIG. 6 illustrates an example of sharing resource information of adjacent links in a D2D network according to an embodiment of the present disclosure.

FIG. 6 illustrates spatial re-use of resources in a D2D network according to an embodiment of the present disclosure.

Referring to FIG. 6, a reception device B collects neighboring resource information. The neighboring resource information may be resource information corresponding to a second link and a third link which are adjacent links. The resource information corresponding to link 2 is shared by a transmission device C of the second link. The resource information corresponding to link 3 is shared by a transmission device E of link 3.

A transmission device A collects resource information shared by a reception device D of the second link corresponding to the adjacent link as neighboring resource information. Since signal reception power from a reception device F of the third link is weak, the transmission device A may not collect resource information shared by the reception device F as the neighboring resource information.

For example, the collection of the neighboring resource information may be performed by resource information exchange between adjacent devices. The resource information exchange between the adjacent devices may be performed by various methods.

As a representative example, there is a method of using a control signal. For example, the resource information may be exchanged using a resource information request message and a resource information response message.

Hereinafter, for convenience of the description, the transmission device is referred to as a TxD and the reception device is referred to as an RxD. The TxD and the RxD are irrelevant to a transmission/reception direction of the control signal and are determined according to a direction in which data is transmitted.

The resource information request message is broadcasted by the transmission device and transmitted to the counterpart reception device and one or more adjacent reception devices. The resource information response message is broadcasted by the reception device and transmitted to the counterpart transmission device and one or more adjacent transmission devices.

Figure 7:
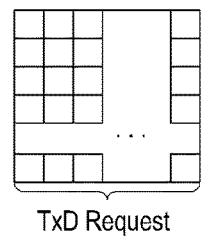
FIG. 7 illustrates an example in which a transmission device for D2D communication transmits a resource information request message to one or more reception devices according to an embodiment of the present disclosure.
Figure 7:
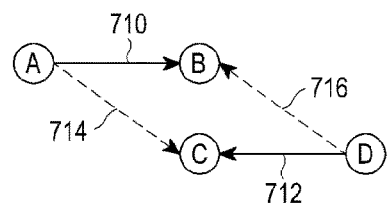

FIG. 7 illustrates that the transmission device for D2D communication transmits the resource information request message to one or more reception devices according to an embodiment of the present disclosure.

Referring to FIG. 7, the transmission devices A and D broadcast the resource information request message in a network where two links (links marked by a solid line) 710 and 712 for D2D communication exist.

The resource information request message broadcasted by the transmission device A is received by the reception device B corresponding to the counterpart device for the D2D communication and the reception device C corresponding to the reception device of the adjacent link. The resource information request message broadcasted by the transmission device D is received by the reception device C corresponding to the counterpart device for the D2D communication and the reception device B corresponding to the reception device of the adjacent link as indicated by reference numerals 714 and 716.

The reception device B may receive all of a self resource information request message transmitted by the counterpart transmission device (transmission device A) and a neighboring resource information request message transmitted by the adjacent transmission device (transmission device D). The reception device C may receive all of a self resource information request message transmitted by the counterpart transmission device (transmission device D) and a neighboring resource information request message transmitted by the adjacent transmission device (transmission device A).

The self resource information request message is marked by solid lines 710 and 712 and the neighboring resource information request message is marked by dotted lines 714 and 716.

Each of the reception devices may share self resource information of the counterpart device and neighboring resource information of adjacent devices by the reception of the resource information request message.

Figure 8:
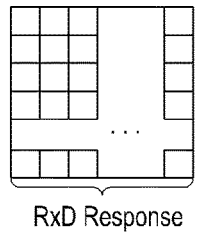
FIG. 8 illustrates an example in which a reception device for D2D communication transmits a resource information response message to a transmission device according to an embodiment of the present disclosure.
Figure 8:
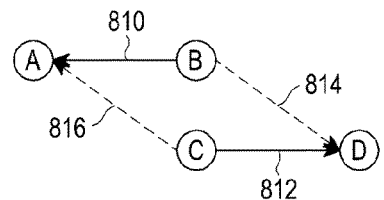

FIG. 8 illustrates that the reception device for D2D communication transmits the resource information response message to the transmission device according to an embodiment of the present disclosure.

Referring to FIG. 8, the resource information response message includes self resource information modified by the reception device. The modified self resource information is resource information modified from the self resource information provided by the counterpart device. The modified self resource information is resource information which the reception device modified so as not to generate collisions with resources to be used in adjacent links in consideration of neighboring resource information of one or more adjacent devices.

According to FIG. 8, in a network where two links (marked by a solid line) 810 and 812 for D2D communication exist, the reception devices B and C transmit the resource information response message to the transmission devices D and A.

For example, the resource information response message transmitted by the reception device B is provided to the counterpart device (transmission device A) for the D2D communication. The resource information response message transmitted by the reception device C is provided to the counterpart device (transmission device D) for the D2D communication.

When the resource information response message is transmitted through a shared channel or a broadcast channel, the transmission device may receive the resource information response message transmitted by the adjacent reception device. For example, the response information response message transmitted by the reception device C may be received by the adjacent transmission device (transmission device A).

The transmission device A receives the resource information response message transmitted by the counterpart reception device (reception device B). The transmission device A may receive the resource information response message transmitted by the adjacent reception device (reception device C).

The transmission device D receives the resource information response message transmitted by the counterpart reception device (reception device C). The transmission device D may receive the resource information response message transmitted by the adjacent reception device (reception device B).

The self resource response messages transmitted by the counterpart reception devices are marked by solid lines 810 and 812 and the neighboring resource information response messages transmitted by the adjacent reception devices are marked by dotted lines 814 and 816.

Each of the transmission devices may share resource information modified by the counterpart device and resource information modified by the adjacent device by the reception of the resource information request message.

FIGS. 7 and 8 commonly assume an OFDM system. That is, entire resources configured by a frequency band and a time band are divided into 64 tones, and control signals corresponding to the resource information request message and the resource information response message are transmitted.

Figure 9:
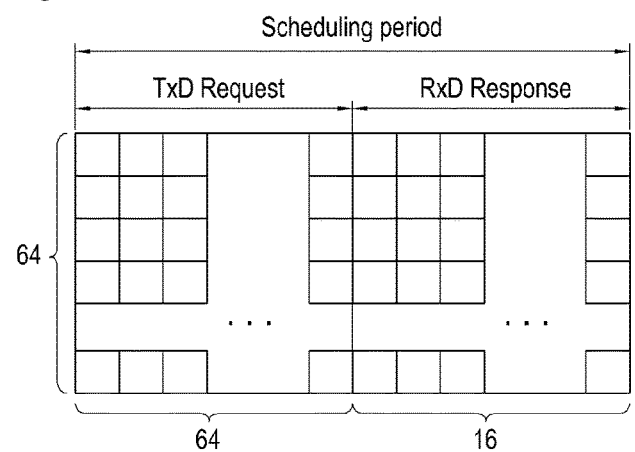
FIG. 9 illustrates an example of a scheduling period in an OFDM system according to an embodiment of the present disclosure.

FIG. 9 illustrates a scheduling period in an OFDM system according to an embodiment of the present disclosure.

Referring to FIG. 9, one scheduling period includes an interval in which the resource information request message is transmitted and an interval in which the resource information response message is transmitted.

The interval in which the resource information request message is transmitted is defined by a time-frequency region including 64 tones and 64 symbols. The interval in which the resource information response message is transmitted is defined by a time-frequency region including 64 tones and 16 symbols.

The interval in which the resource information request message is transmitted includes 4096 (64×64, 212) tone-symbol regions. An index for identifying the tone-symbol regions included in the interval in which the resource information request message is transmitted is expressed by 12 bits.

The interval in which the resource information response message is transmitted includes 1024 (64×16, 210) tone-symbol regions. An index for identifying the tone-symbol regions included in the interval in which the resource information response message is transmitted is expressed by 10 bits.

Figure 10:
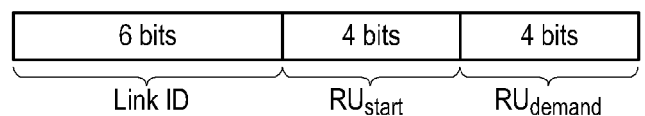
FIG. 10 illustrates an example of a resource information request message according to an embodiment of the present disclosure.

FIG. 10 illustrates a structure of the resource information request message according to an embodiment of the present disclosure.

Referring to FIG. 10, the resource information request message includes resource information defined by 12 bits. The resource information of 12 bits includes a link ID of 6 bits, a slot start point of 4 bits (that is, the resource allocation start position (RUstart)), and a resource allocation demand amount of 4 bits (or the number of slots to be used) (RUdemand).

The link ID is information for identifying a D2D link to which the resources will be allocated. The resource allocation start position (RUstart) is a slot index indicating a start slot among the slots corresponding to the resources to be allocated to the D2D link corresponding to the link ID. The resource allocation demand amount (RUdemand) is the number of slots corresponding to the resources to be allocated to the D2D link corresponding to the link ID.

The RUdemand is expressed by 4 bits to indicate the number of slots from 1 to 16. In another example, the RUdemand may be expressed by 2 bits to reduce loads of the control signal. For example, the RUdemand may correspond to the number of slots of 1, 4, 8, or 16.

The reception device may recognize that a request for allocating resources as many as the number of slots (recognized by the RUdemand) to be used from a slot (recognized by the RUstart) corresponding to a start point of a target link (identified by a link ID) has been made by the resource information included in the resource information request (TxD request) message.

For example, the resource allocation demand amount (RUdemand) may be calculated by the transmission device based on feedback information reported by the reception device. The feedback information includes a channel measurement value. The channel measurement value may be CQI information. The channel measurement value may be measured by the reception device by using a signal transmitted by the transmission device. The transmission device may periodically or aperiodically transmit a pilot signal to perform the channel measurement.

Through Equation (1) below, the transmission device calculates the resource allocation demand amount (RUdemand) by using the feedback information reported by the reception device.

Math Figure 1

$$RU_{demand} = F\left(\frac{\hat{R}}{\overline{R}}\right) \qquad [\text{Math. 1}]$$

$F(\cdot)$ denotes a quantization function, $\hat{R}$ denotes an instantaneous transmission rate of an RU allocated by scheduling, and $\overline{R}$ denotes an average transmission rate of the device.

The transmission device does not calculate the resource allocation demand amount (RUdemand) through Equation (1) alone. The resource allocation demand amount (RUdemand) may be calculated by another scheme as well as Equation (1).

For example, resource allocation demand amount (RUdemand) may be calculated by $$F\left(\frac{\hat{R}}{\overline{R}} \times \frac{1}{N_{neighbors}}\right)$$

or $$F\left(\frac{\hat{R}}{\overline{R}} \times L_{queue}\right).$$

$N_{neighbors}$ denotes the number of adjacent reception devices and $L_{queue}$ denotes a data amount ready to perform transmission.

The resource allocation start position ($RU_{start}$) may be determined by resource information adjusted by the counterpart reception device.

The resource information request (TxD Request) message including the resource allocation start position ($RU_{start}$) and the resource allocation demand amount ($RU_{demand}$) may be transmitted in one of the tone-symbol regions illustrated in FIG. 8.

Figure 11:
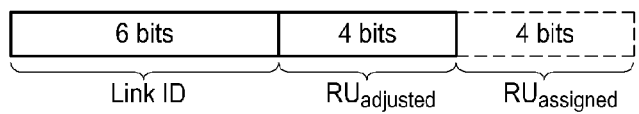
FIG. 11 illustrates an example of a resource information response message according to an embodiment of the present disclosure.

FIG. 11 illustrates a structure of the resource information response message according to an embodiment of the present disclosure.

Referring to FIG. 11, the resource information response message includes adjusted resource information defined by 10 bits. The adjusted resource information of 10 bits includes a link ID of 6 bits, a resource allocation start position of 4 bits to be changed ($RU_{adjusted}$), and a resource allocation amount of 4 bits (or the number of slots to be used) ($RU_{assigned}$).

The $RU_{assigned}$ may not be used to reduce the loads of the control signal. In this case, the reception device should transmit information related to a slot to be used to the transmission device when transmitting data.

The link ID is information for identifying a D2D link to which the resources will be allocated. The resource allocation start position to be changed ($RU_{adjusted}$) is a slot index indicating a start slot to be changed instead of the resource allocation start position ($RU_{start}$) collected for the corresponding D2D link by the resource information request message.

The transmission device may allocate resources by the adjusted resource information included in the resource information response message. The resources to be allocated may be determined by the number of slots to be used (recognized by $RU_{assigned}$ which is calculated by the feedback information reported by the reception device from the slots (recognized by $RU_{start}$ corresponding to the start point determined when the request for the link (identified by the link ID) is made. In the above described example, the reason why the resource unit start point ($RU_{start}$) determined when the request is made is used is that information on the number of slots to be used $RU_{assigned}$ determined when the scheduling is performed may become inaccurate when each link changes the start point.

Through Equation (2) below, the reception device calculates the resource allocation start position ($RU_{assigned}$) to be changed based on the resource information of the counterpart device and adjacent transmission device collected through the resource information request message.

MathFigure 2

$$RU_{adjusted} = \lfloor (1-\alpha) \times RU_{start} + \alpha \times RU_{dest} \rfloor \% M \qquad [\text{Math.2}]$$

$\alpha$ denotes an averaging factor which allows the resource allocation start position ($RU_{start}$) to be gradually changed and may be defined by a value between 0 and 1.

$RU_{start}$ denotes the resource allocation start position included in the resource information of the counterpart reception device collected by the resource information request message, $RU_{dest}$
  denotes a position (that is, index) indicating a target point of a next resource allocation start position, M
  denotes the number of entire RUs which can be allocated to the D2D links, and % denotes a modulo operation.

In Equation (2) above, the resource allocation start position ($RU_{adjusted}$)
to be changed using the modulo operation is defined. This is to allocate the resource allocation start position ($RU_{start}$) and the resource allocation start position ($RU_{adjusted}$)
to be changed as integers between 0 and 15 by a circular scheme. For example, when the resource allocation start position ($RU_{start}$)
is 14 and the resource allocation demand amount ($RU_{demand}$) is 4, four slots having slot indexes of 14, 15, 0, and 1 are allocated as the resources to be used.

Meanwhile, in Equation (2),
$RU_{dest}$
  may be determined by Equation (3) below.

Math Figure 3

$$RU_{dest} = \left[\frac{D_m \cdot RU_{prev} + D_p \cdot RU_{next}}{D_p + D_m}\right] \% \, M \quad \text{[Math. 3]}$$

$RU_{prev}$
  is an index left closest to
$RU_{start}$
  (that is, slot index) requested by the transmission device of the target link among resource allocation start positions (that is, slot indexes) requested by the transmission device of the adjacent link causing interference, $RU_{next}$
  is an index right closest to
$RU_{start}$
  (that is, slot index) requested by the transmission device of the target link among resource allocation start positions (that is, slot indexes) requested by the transmission device of the adjacent link causing interference, $D_m$
  is a sum of resource allocation demand amounts ($RU_{demand}$)
  requested in a subject having made a request for a slot index corresponding to as a resource allocation start position ($RU_{start}$)
and in all adjacent links, and $D_p$
  is a sum of resource allocation demand amounts requested in all adjacent links having made a request for a slot index corresponding to as a resource allocation start position ($RU_{prev}$).

A left direction of the slot index refers to a smaller number of the slot index. However, in a case of a circular index, a slot index left closest to 0 means M−1.

Equation (3) above defines determining a next resource allocation start position corresponding to a next target point in consideration of a rate of a resource allocation demand amount in each of the recognized
$RU_{prev}$
  and
$RU_{start}$.

Figure 12:
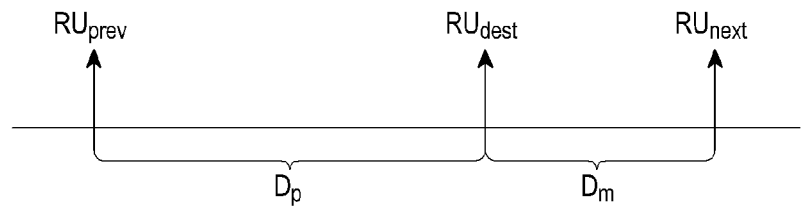
FIG. 12 intuitively expresses determination of a destination RU by a reception device in consideration of resource demand amounts of neighboring devices according to an embodiment of the present disclosure.

FIG. 12 intuitively expresses determination of a destination RU corresponding to a next resource allocation start position by the reception device according to an embodiment of the present disclosure.

Referring to FIG. 12,
$RU_{dest}$
  is determined such that a ratio between resource allocation demand amounts in different intervals becomes the same as a ratio between
$D_p$
  and
$D_m$.

The resource allocation demand amounts may be a resource allocation demand amount between the resource allocation start position ($RU_{prev}$)
  in previous transmission and a destination resource allocation start position ($RU_{dest}$)
  in this transmission and a resource allocation demand amount between the destination resource allocation start position ($RU_{dest}$)
  in this transmission and a resource allocation start position ($RU_{next}$)
  in next transmission.

For example, when
$RU_{prev}$
  is "1" and
$RU_{next}$
  is "5",
$D_p$
  may have a value of "3" and
$D_m$
  may have a value "1". Based on Equation (3) above, the target point ($RU_{dest}$)
corresponding to the next resource allocation start position may be determined as $$"4\left(= \frac{1 \cdot 1 + 3 \cdot 5}{3+1}\right)".$$

Equation (4) below is defined to calculate the resource allocation demand amount
$D_p$
  in
$RU_{prev}$.

Math Figure 4

$$D_p = \sum_{\forall RUindex = RU_{prev}} RU_{demand} \quad \text{[Math. 4]}$$

$RU_{demand}$
  denotes a resource allocation demand amount obtained by reception of the resource information request message broadcasted from the transmission device.

Equation (4) above defines
$D_p$
  by a sum of the resource allocation demand amounts ($RU_{demand}$)
  of adjacent links considering a previous resource allocation start position
$RU_{prev}$
  as
$RU_{start}$.

Equation (5) below is defined to calculate the resource allocation demand amount $D_m$
in
$RU_{start}$.

MathFigure 5

$$D_m = \sum_{\forall RUindex = RU_{start}} RU_{demand} \qquad [\text{Math. 5}]$$

For example, Equation (5) above defines $D_m$ by a sum of resource demand amounts of its own and adjacent links $RU_{demand}$ considering a resource allocation start position $RU_{start}$ obtained by reception of the resource information request message broadcasted from the transmission device as $RU_{start}$.

Based on Equations (2) and (5) above, the reception device corrects the resource allocation start position based on resource information collected through the resource information request message broadcasted by the counterpart and adjacent devices.

The reception device may not recognize one or both of $RU_{prev}$ and $RU_{next}$ in an SIR detecting process. In this case, the reception device cannot calculate $RU_{dest}$ as both $RU_{prev}$ and $RU_{next}$ are required in Equation (3).

Table 1 below defines a modification example for calculating $RU_{dest}$ by considering whether $RU_{prev}$ and $RU_{next}$ are recognized in the SIR detecting process.

TABLE 1

| $RU_{dest}$ |
| --- |
| $[RU_{start} + (D_p \cdot RU_{gap\_next} - D_m \cdot RU_{gap\_prev})/(D_p + D_m)]\%M$ |
| $[RU_{start} + (D_p \cdot (M - RU_{gap\_prev}) - D_m \cdot RU_{gap\_prev})/(D_p + D_m)]\%M$ |
| $[RU_{start} + (D_p \cdot (M - RU_{gap\_next}) - D_m \cdot RU_{gap\_next})/(D_p + D_m)]\%M$ |
| $RU_{start}$ |
| $RU_{start}$ |

In Table 1, the newly defined $RU_{gap\_next}$ corresponds to a difference between a resource allocation start position $RU_{next}$ in next transmission and a current resource allocation start position $RU_{start}$. $RU_{gap\_next}$ is defined by Equation (6) below.

MathFigure 6

$$RU_{gap\_next} = [RU_{next} - RU_{start}]\% M \qquad [\text{Math.6}]$$

In Table 1, the newly defined $RU_{gap\_prev}$ corresponds to a difference between the current resource allocation start position $RU_{start}$ and a previous resource allocation start position.

$RU_{gap\_prev}$ is defined by Equation (7) below.

MathFigure 7

$$RU_{gap\_prev} = [RU_{start} - RU_{prev}]\% M \qquad [\text{Math.7}]$$

As identified through Table 1 and Equations (6) and (7) above, when both $RU_{next}$ and $RU_{prev}$ are recognized, $RU_{dest}$ is calculated using both $RU_{gap\_next}$ which can be obtained by $RU_{next}$ and $RU_{gap\_prev}$ which can be obtained by $RU_{prev}$.

When only $RU_{prev}$ is recognized, $RU_{dest}$ is calculated using only $RU_{gap\_prev}$, which can be obtained by $RU_{prev}$.

When only $RU_{next}$ is recognized, $RU_{dest}$ is calculated using only $RU_{gap\_next}$ which can be obtained by $RU_{next}$.

Further, when both $RU_{next}$ and $RU_{prev}$ cannot be recognized, $RU_{start}$ is considered as $RU_{dest}$. That is, when both $RU_{next}$ and $RU_{prev}$ cannot be recognized, $RU_{start}$ does not change.

The reception device determines resources to be allocated to the D2D link configured by the reception device itself as RUs between a slot index ($RU_{next}$) right closest to $RU_{start}$ requested by the transmission device of the target link in the resource allocation start position requested by the transmission device of the adjacent link causing interference and an index ($RU_{start}$) corresponding to a current resource allocation start time point.

When a resource slot range to be allocated is determined, a case where $RU_{prev}$ and $RU_{next}$ cannot be recognized may occur. The reception device is required to define examples where RUs ($RU_{assigned}$) to be allocated are differently calculated in consideration of whether $RU_{prev}$ and $RU_{next}$ are recognized.

Table 2 below shows an example in which the reception device determines the RU ($RU_{assigned}$) to be allocated in consideration of whether $RU_{prev}$ and $RU_{next}$ are recognized.

TABLE 2

| |
| --- |
| $RU_{assigned}$ |
| $RU_{assigned} = [RU_{next} - RU_{start}] \% M$ |
| $RU_{assigned} = [RU_{prev} - RU_{start}] \% M$ |
| $RU_{assigned} = [RU_{next} - RU_{start}] \% M$ |
| $RU_{assigned} = M$ |

Based on Table 2 above, when both $RU_{next}$ and $RU_{prev}$ are recognized or only $RU_{next}$ is recognized, there is no problem in determining RUs existing between $RU_{start}$ and $RU_{next}$ as the resource allocation range ($RU_{assigned}$). In these two cases, the range of RUs ($RU_{assigned}$) to be allocated is determined by the same rule.

When only $RU_{prev}$ is recognized, RUs existing between $RU_{prev}$ and $RU_{start}$ are used as the resources ($RU_{assigned}$) to be allocated. Further, when both $RU_{next}$ and $RU_{prev}$ cannot be recognized, entire URs (M) are considered as slot RUs $RU_{assigned}$ to be allocated. That is, when both $RU_{next}$ and $RU_{prev}$ cannot be recognized, the entire RUs are considered as the range of resources to be allocated.

Figure 13:
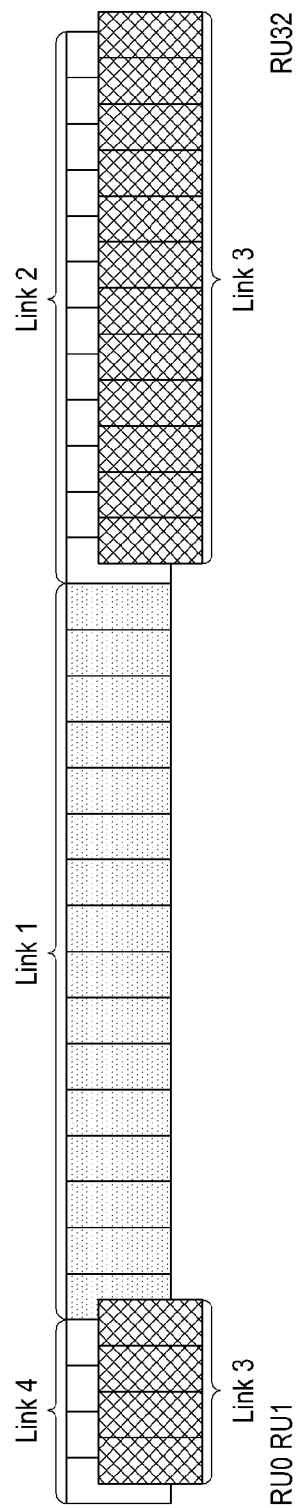
FIG. 13 illustrates an example of resource allocation for increasing a resource re-use rate in a wireless network supporting D2D communication according to an embodiment of the present disclosure.

FIG. 13 illustrates resource allocation for increasing a resource re-use rate in a wireless network supporting D2D communication according to an embodiment of the present disclosure.

FIG. 13 premises the structure of the link supporting the D2D communication in the wireless network illustrated in FIG. 6. For example, first and second links are located close to each other and cannot use the same resource. For example, first and third links are also located close to each other and cannot use the same resource. Since the second and third links do not give interference to each other from the point of view of devices D and F, the second and third links can simultaneously transmit data by using the same resource.

In FIG. 13, only resources which can independently used for the first link are allocated and resources which can be shared between the second and third links are allocated.

As a result, it is noted that the number of time slots to be used for data link by the first link is 16 and the number of time slots to be used for data transmission by the second or third link is 16. However, the second and third links will transmit data by using the same 16 time slots.

That is, in FIG. 13, 16 time slots corresponding to half of the entire resources, that is, 32 time slots are allocated to the first link and the remaining 16 time slots are shared by the second and third links and data is transmitted there through.

Figure 14:
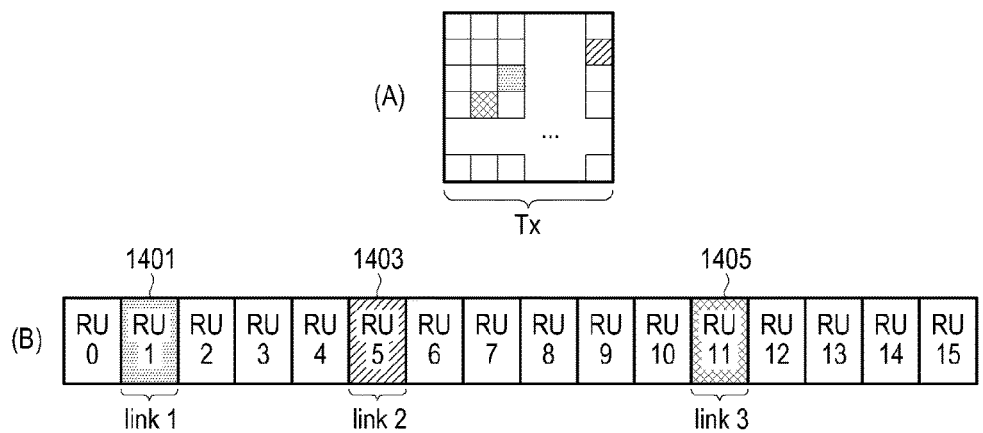
FIG. 14 illustrates a resource start position to be used, which a transmission device transmits to a reception device according to an embodiment of the present disclosure.

FIGS. 14A and 14B illustrate resource allocation by resource information transmitted to the reception device by the transmission device according to an embodiment of the present disclosure.

Referring to FIG. 14A, resource information request messages including resource information of respective D2D links are transmitted through different tone-symbol regions in the time-frequency domain.

For example, referring to FIG. 14B, when it is assumed that the number of time slots included in one frame corresponding to one transmission cycle is 16, reference numerals 1401, 1403, and 1405 refer to resource allocation start positions ($RU_{start}$) in the first, second, and third links identified by link IDs included in the resource information, respectively.

That is, RU #1 1401 is an RU index corresponding to the resource allocation start position ($RU_{start}$) included in the resource information of the first link RU #5 1403 is an RU index corresponding to the resource allocation start position ($RU_{start}$) included in the resource information of the second link RU #11 1405 is an RU index corresponding to the resource allocation start position ($RU_{start}$) included in the resource information of the third link.

Although not illustrated, the resource allocation demand amount ($RU_{demand}$) included in the resource information of the first, second, and third links is determined as a predetermined number at the beginning, but determined as a value obtained based on a channel status calculated in a data transmission process if there is the data transmission process.

Figure 15:
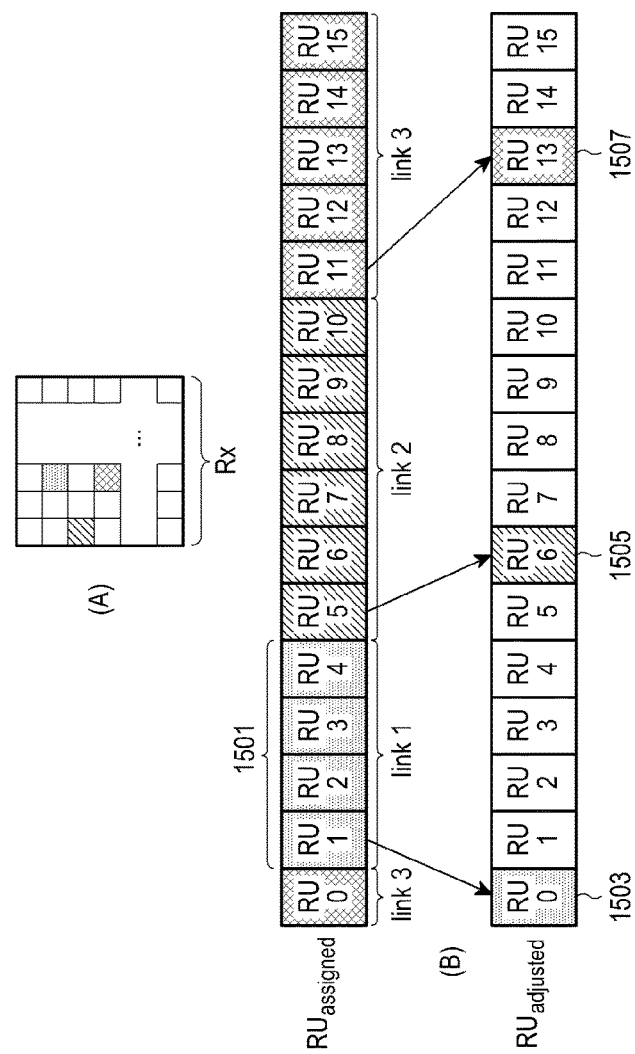
FIG. 15 illustrates an example of resource allocation by resource information, which a transmission device transmits to a reception device according to an embodiment of the present disclosure.

FIGS. 15A and 15B illustrate that the reception device allocates resources based on resource information which the transmission device transmits to the reception device and transmits adjusted resource information (resource start position) to the transmission device according to a result of the adjustment of the resource start position for next transmission.

Referring to FIG. 15A, resource information response messages including adjusted resource information of respective D2D links are transmitted through different tone-symbol regions in the time-frequency domain.

When it is assumed that the number of time slots is 16 in an example of a structure of upper resources in FIG. 15B, a resource allocation amount ($RU_{assigned}$) may be determined according to a resource allocation start position ($RU_{start}$) included in the resource information collected for each of the first, second, and third links.

For example, since a resource allocation start position ($RU_{start}$) of the first link is "RU1" and a resource allocation start position ($RU_{start}$) of the second link is "RU5", the resource allocation amounts ($RU_{assigned}$) of the first link are determined as "four RUs (RU1, RU2, RU3, and RU4)".

Since the resource allocation start position ($RU_{start}$) of the second link is "RU5" and a resource allocation start position ($RU_{start}$) of the third link is "RU11", the resource allocation amounts ($RU_{assigned}$) of the second link are determined as "six RUs (RU5, RU6, RU7, RU8, RU9, and RU10)".

Since the resource allocation start position ($RU_{start}$) of the third link is "RU11 " and the resource allocation start position ($RU_{start}$) of the first link is "RU1", the resource allocation amounts ($RU_{assigned}$) of the third link are determined as "six RUs (RU11, RU12, RU13, RU14, RU15, and RU0)".

When it is assumed that the number of time slots is 16 in an example of a structure of lower resources in FIG. 15B, an adjusted resource allocation start position ($RU_{adjusted}$) may be determined according to a resource allocation start position ($RU_{start}$) and a resource allocation demand amount ($RU_{demand}$) included in the resource information collected for each of the first, second, and third links.

For example, an RU index of the resource allocation start position ($RU_{start}$) of the first link is changed from "RU1" to "RU0". An RU index of the resource allocation start position ($RU_{start}$) of the second link is changed from "RU5" to "RU6". An RU index of the resource allocation start position ($RU_{start}$) of the third link is changed from "RU 11" to "RU13". The reception device of each link inserts the changed resource allocation start position ($RU_{adjusted}$) into the resource information and transmits the resource information to the transmission device.

Figure 16:
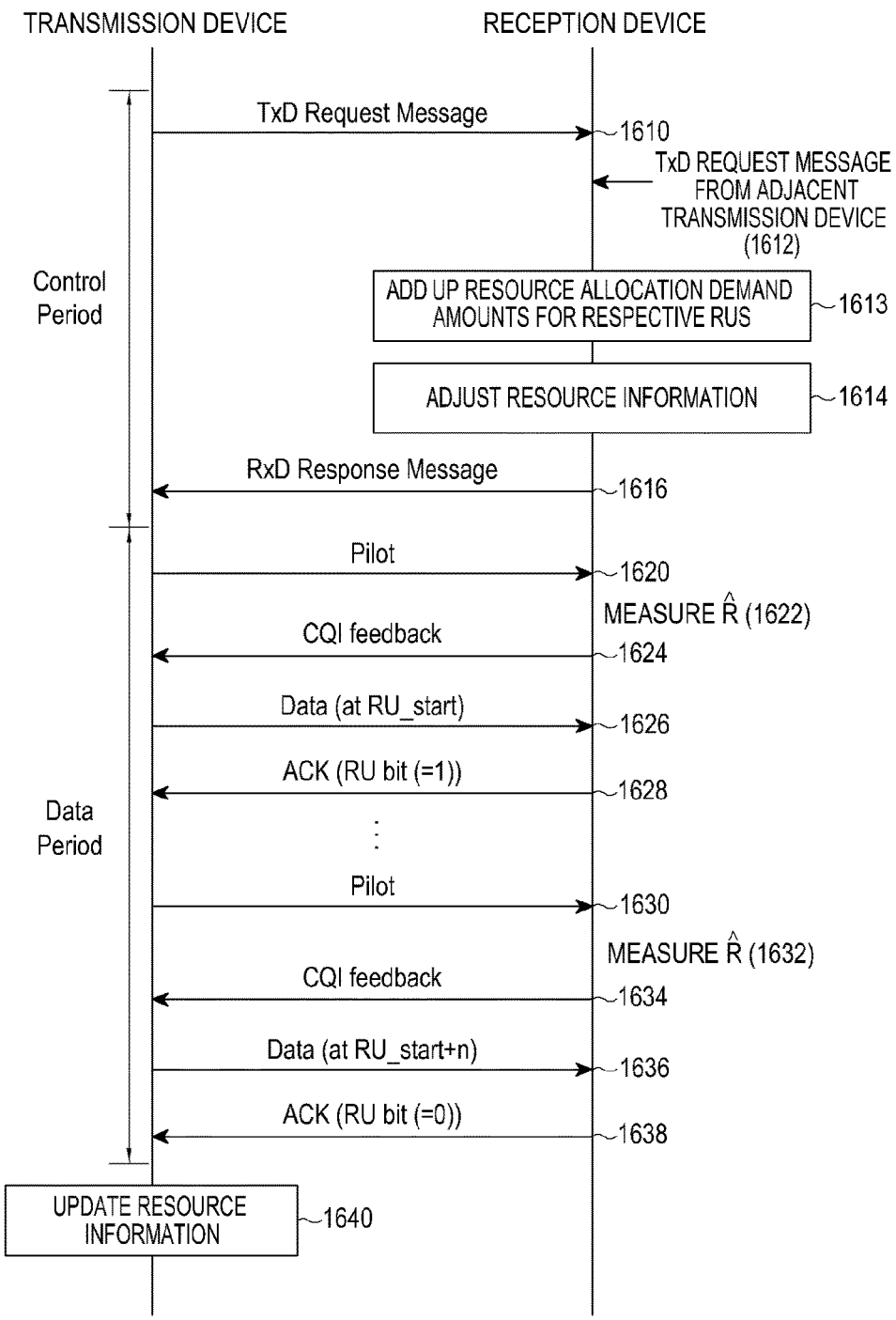
FIG. 16 illustrates a process for performing distributed scheduling in a D2D communication system according to an embodiment of the present disclosure.

FIG. 16 illustrates a process for performing distributed scheduling in a D2D communication system according to an embodiment of the present disclosure.

Referring to FIG. 16, the process for performing the distributed scheduling includes a control period, a data transmission period, and a resource information update period.

The control period is a period in which the reception device allocates resources according to resource information provided by the transmission device and performs a process of adjusting the resource information. The transmission device may determine resources to be finally used according to adjusted resource information provided by the reception device and additionally perform a resource information determining process of informing the reception device of resource information on the resources.

The data transmission period is a period in which a process of transmitting data based on initial resource information or adjusted resource information. The data transmission period includes a process in which the reception device measures channel quality and reports the measured channel quality to the transmission device.

The resource information update period is a period in which existing resource information is updated based on the adjusted resource information and the channel quality reported from the reception device.

Referring to FIG. 16, the transmission device broadcasts a resource information request message in step 1610. The resource information request message includes information on a slot start point (that is, a resource allocation start position ($RU_{start}$)) and a resource allocation demand amount (or the number of slots to be used ($RU_{demand}$). That is illustrated in FIG. 10.

The transmission device may determine the resource allocation demand amount (or the number of slots to be used) ($RU_{demand}$) by Equation (1) defined above. An initial resource allocation demand amount before the feedback information is reported from the reception device may be determined in consideration of an amount of data to be transmitted, the type of data and the like. The transmission device may update the previous slot start point (that is, the resource allocation start position ($RU_{start}$)) by the resource information adjusted by the reception device.

An operation of updating or calculating the resource information, that is, the slot start point (that is, the resource allocation start position ($RU_{start}$)) and the resource allocation demand amount (or the number of slots to be used) ($RU_{demand}$) is performed in step 1640.

The broadcasting of the resource information request message by the transmission device is not only for the transmitting device to receive the resource information request message of the counterpart reception device, but also of the adjacent reception device as well. Accordingly, the reception device receives a resource allocation message of the counterpart transmission device and a resource allocation message of the adjacent transmission device in step 1612.

The reception device shares resource information of one or more adjacent transmission devices by receiving the resource information request messages from the one or more adjacent transmission devices.

The reception device adds up the resource allocation amounts collected by the resource information request messages received in the unit of predefined units. The resource allocation amounts collected by the received resource information request message may be added for each index of the RU.

The reception device adjusts self resource information by using the self resource information included in the resource information request message received from the counterpart transmission device and neighboring resource information included in the resource information request message received from one or more adjacent transmission devices in step 1614. The reception device adjusts the self resource information provided by the counterpart transmission device such that the self resource information does not collide with resources to be used in the adjacent link with reference to the neighboring resource information collected from the one or more adjacent transmission devices. The reception device determines resource information to be adjusted by the counterpart transmission device.

The reception device generates a resource information response message by the resource information to be adjusted and transmits the generated resource information response message to the counterpart transmission device in step 1616. The resource information response message includes information on a link ID and a resource allocation start position to the changed ($RU_{adjusted}$). That is as illustrated in FIG. 11.

The resource information response message may further include information on a resource allocation demand amount to be changed (or the number of slots to be used) ($RU_{demand}$). The resource information response message may include indexes of respective slots corresponding to the resources to be allocated instead of the information on the resource allocation start position to be changed ($RU_{adjusted}$) and the resource allocation demand amount (or the number of slots to be used) ($RU_{demand}$).

When the transmission device receives the resource information response message from the counterpart reception device, the transmission device identifies resource information to be adjusted, which is included in the received resource information response message. The transmission device may determine whether the resource information to be adjusted, which the transmission device should identify by the link ID included in the received resource information response message is included in the resource information response message.

The transmission device performs the operation in the data transmission period when the process in the control period has been completed.

Specifically, the transmission device periodically transmits a pilot signal to estimate a downlink channel status in steps 1620 and 1630. The reception device may estimate a downlink channel characteristic by the received pilot signal in steps 1622 and 1632.

The channel characteristic estimated by the reception device may be an instantaneous transmission rate ($\hat{R}$) in the RU allocated by the scheduling. The reception device may measure a channel by using pilot signals transmitted by a plurality of adjacent transmission devices. That is, the reception device receives pilot signals transmitted by the counterpart transmission device and a plurality of adjacent transmission devices and measures an instantaneous transmission rate ($\hat{R}$) in the RU allocated by the scheduling based on the received pilot signals. The reception device generates CQI corresponding to $\hat{R}$ measured by one or more pilot signals and feeds back the generated CQI to the transmission device in steps 1624 and 1634.

The reception device receives data periodically transmitted by the transmission device in the resource allocation start position ($RU_{start}$) included in the self resource information collected by the resource information request message in steps 1626 and 1636. The reception device transmits an ACK signal to the transmission device in response to each of the received data pieces.

The transmission device transmits data by using the predetermined number of time slots in a transmission time point determined in every transmission cycle by the self resource information. For example, the transmission cycle may be one frame including 16 time slots. In this case, the transmission device transmits data for the number of time slots allocated from the time slot corresponding to the transmission time point among the 16 time slots included in every frame.

In response to the data, the reception device transmits an ACK signal to the transmission device as a response signal to the data reception in every frame. The reception device may transmit an additional resource bit indicating whether a next slot is allocated together with the ACK signal. For example, when the next slot is allocated, the reception device configures the additional resource bit as "on (bit value "1") and transmits the additional resource bit in step 1628. However, when the next slot is not allocated, the reception device configures the additional resource bit as "off (bit value "0") and transmits the additional resource bit in step 1638. The reception device turns "off" and transmits the additional resource bit when it is determined that data by all resources corresponding to a sum of the obtained resource allocation demand amounts has been transmitted. That is, when there is no more remaining resource in the allocated resources, the reception device provides the additional resource bit configured as "off" to the transmission device. This instructs the transmission device to update the resource information.

The transmission device performs an operation for updating the resource information when the additional resource bit is configured as "off (bit value "0") in step 1640.

Figure 17:
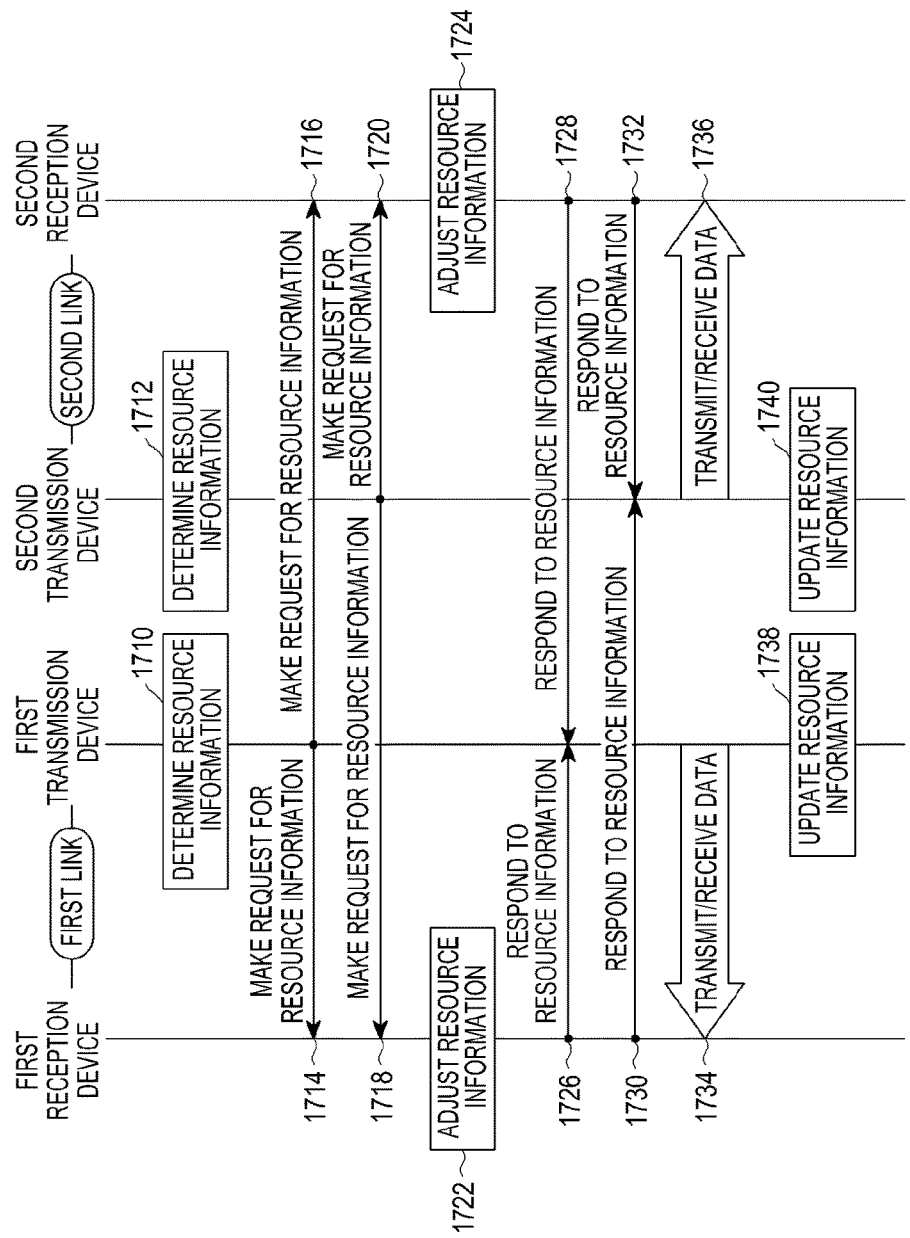
FIG. 17 illustrates an example of a process of performing distributed scheduling in two links according to an embodiment of the present disclosure.

FIG. 17 illustrates another example of the process of performing the distributed scheduling in the D2D communication system.

Referring to FIG. 17, a process of performing the distributed scheduling of determining transmission/reception resources between two links by a resource information request and response.

FIG. 17 assumes a network state in which two D2D links, that is, a first link and a second link, exist. The first link is a link between a first transmission device and a first reception device and the second link is a link between a second transmission device and a second reception device.

Each of the first transmission device and the second transmission device determines resource information which each of them desires to transmit in steps 1710 and 1712.

The first transmission device broadcasts a resource information request message including the determined resource information in steps 1714 and 1716. The resource information request message broadcasted by the first transmission device is received by the first reception device having formed the first link with the first transmission device and the second reception device having formed the adjacent second link.

The second transmission device broadcasts a resource information request message including the determined resource information in steps 1718 and 1720. The resource information request message broadcasted by the second transmission device is received by the second reception device having formed the second link with the second transmission device and the first reception device having formed the adjacent first link.

The first reception device adjusts resource information required for the response based on the resource information included in the received resource information request message in step 1722. The second reception device adjusts resource information required for the response based on the resource information included in the received resource information request message in step 1724.

The first reception device configures a resource information response message including the adjusted resource information and broadcasts the configured resource information response message in steps 1726 and 1730. The broadcasted resource information response message may be received by the second transmission device having formed the second link adjacent to the first transmission device having formed the first link.

The second reception device configures a resource information response message including the adjusted resource information and broadcasts the configured resource information response message in steps 1728 and 1732. The broadcasted resource information response message may be received by the first transmission device having formed the first link adjacent to the second transmission device having formed the second link.

The first transmission device transmits/receives data to/from the first reception device based on the adjusted resource information received through the resource information response message in step 1734. The second transmission device transmits/receives data to/from the second reception device based on the adjusted resource information received through the resource information response message in step 1734.

The first and second transmission devices update the resource information after completing data transmission/reception with the first and second reception devices in steps 1738 and 1740.

Figure 18:
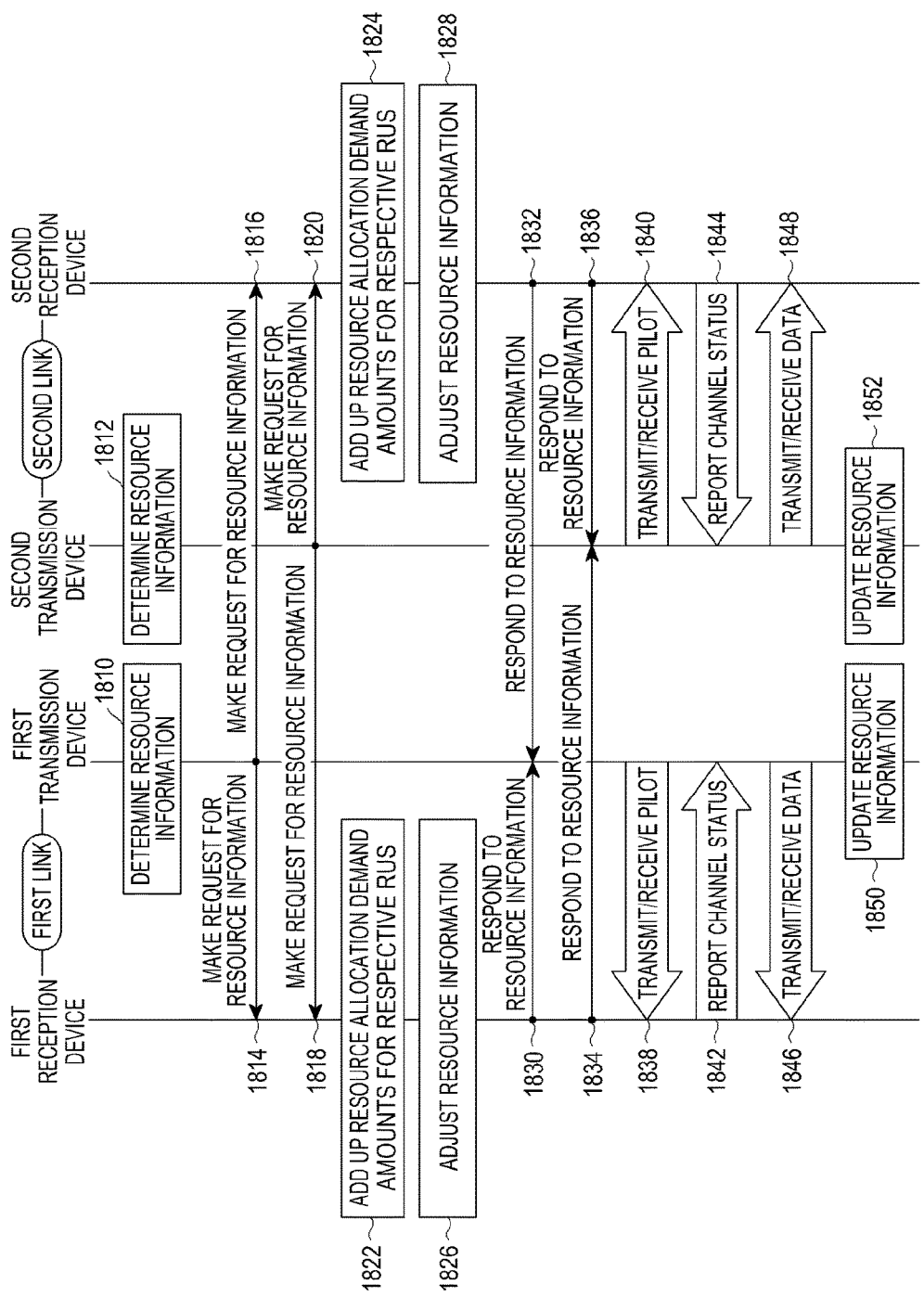
FIG. 18 illustrates another example of the process of performing the distributed scheduling in the two links according to an embodiment of the present disclosure.

FIG. 18 illustrates another example of the process of performing the distributed scheduling based on a channel status report in the D2D communication system according to an embodiment of the present disclosure.

Referring to FIG. 18, a process for performing the distributed scheduling of performing transmission/reception resources between two links by a resource information request and response in consideration of a resource allocation demand amount between links according to a channel status report.

FIG. 18 assumes a network state in which two D2D links, that is, a first link and a second link, exist. The first link is a link between a first transmission device and a first reception device. The second link is a link between a second transmission device and a second reception device.

Each of the first transmission device and the second transmission device determines resource information which each of them desires to transmit in steps 1810 and 1812.

The first and second transmission devices broadcast a resource information request message including the determined resource information in steps 1814, 1816, 1818, and

1820. The resource information request message broadcasted by the first and second transmission devices is received by a reception device having formed a link with the transmission device and a reception device having formed an adjacent link.

The first reception device adds up resource information included in the received resource information request messages, that is, resource allocation demand amounts for each RU in step 1822. The first reception device adjusts resource information required for a response based on the resource allocation demand amount added for each RU in step 1826.

The second reception device adds up resource information included in the received resource information request messages, that is, resource allocation demand amounts for each RU in step 1824. The second reception device adjusts resource information required for a response based on the resource allocation demand amount added for each RU in step 1828.

The first and second reception devices configure a resource information response message including the adjusted resource information and broadcast the configured resource information response message. The broadcasted resource information response messages may be received by the transmission device having formed the link with the reception device and the transmission device having formed the adjacent link in steps 1830, 1832, 1834, and 1836.

The first and second transmission devices transmit pilot signals to the reception devices having formed the links with themselves based on the adjusted resource information received through the resource information response messages in steps 1838 and 1840.

The first and second reception devices measure channel statuses of links, that is, first and second links based on the received pilot signals. The first and second reception devices report the channel statuses measured for the links configured by the first and second reception devices to transmission devices corresponding to counterpart devices in steps 1842 and 1844.

The first and second transmission devices transmit/receive data to/from the reception devices having formed the links with themselves based on the adjusted resource information received through the resource information response messages in steps 1846 and 1848.

The first and second transmission devices update the resource information after completing data transmission/reception with the first and second reception devices in steps 1850 and 1852. The resource information is updated based on the reported channel statuses. The resource information may be updated by a change in the resource allocation start position and the resource allocation demand amount.

FIGS. 19A, 19B, and 19C illustrates a resource allocation process converges when a method of performing distributed scheduling on resources is performed according to an embodiment of the present disclosure.

Referring to FIGS. 19A, 19B, and 19C, the RU index (that is, the slot index) has a circular allocation structure. The RU index of the start position (RU start) of resources between D2D links are differently shared. When the provided scheduling operation is repeatedly performed, four slots of a total of sixteen slots converge at resource start positions (RU start) 1901, 1903, 1905, and 1907 in each link in FIG. 19C.

FIGS. 20A, 19B, and 19C illustrate improvement of a frequency re-use rate in a method of performing the distributed scheduling on resources according to an embodiment of the present disclosure.

Referring to FIGS. 20A, 20B, and 20C, the resource allocation position ($RU_{adjusted}$) and the resource allocation demand amount ($RU_{assigned}$) are modified according to the repetitive performance of the distributed scheduling. As a result of the repetitive performance of the distributed scheduling, when an SIR of an adjacent link is larger than a threshold, there is no influence by interference between a particular link and the adjacent link. In this case, even though two links share resources from the third slot to the seventh slot as indicated by a reference numeral 2001, interference is not generated between the two links.

When the two links are the first and second links, the transmission device of the first link and the reception device of the second link are spaced apart from each other so that they do not give interference to each other and the reception device of the first link and the transmission device of the second link are spaced apart from each other so that they do not give interference to each other.

Accordingly, it is possible to improve a frequency re-use rate in the D2D network and also maximize the number of simultaneous transmission links. It is preferable that a sum of interference generated due to resources overlapping used between links is reflected in the resource allocation scheduling.

Figure 21:
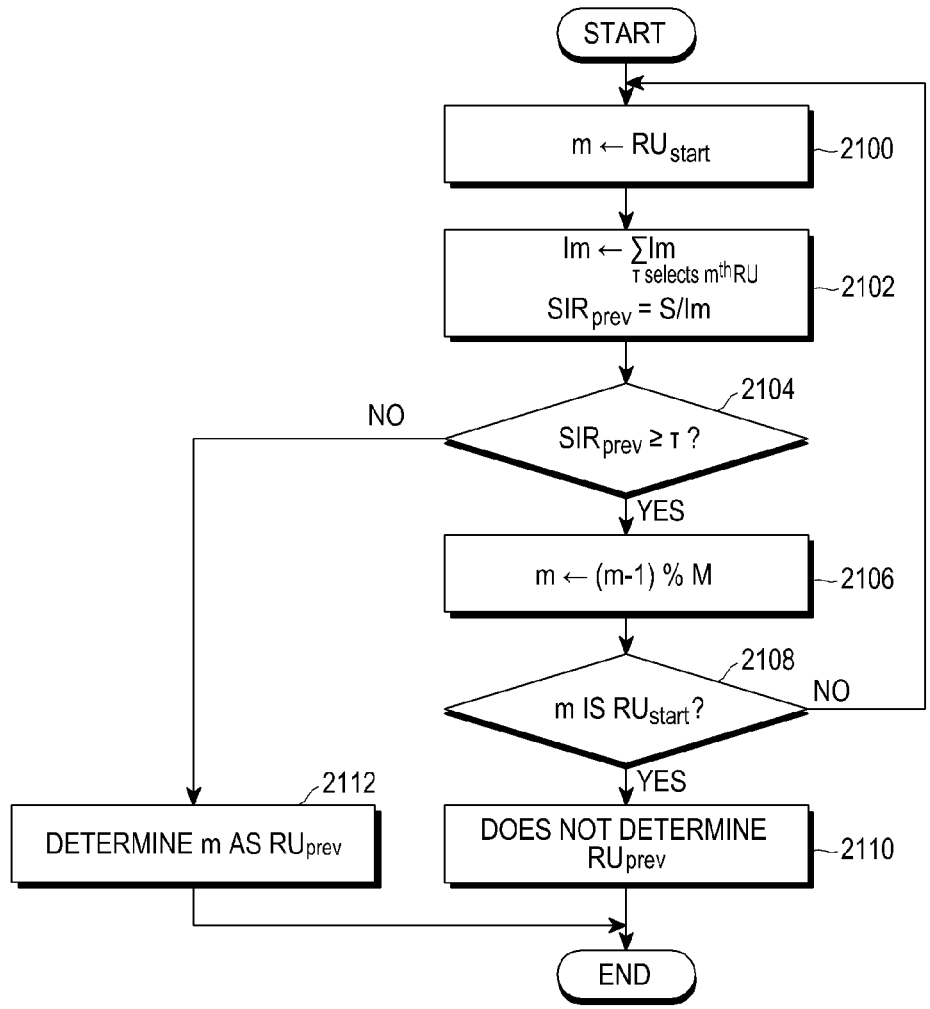
FIG. 21 illustrates a control flow in which a reception device discovers an RU giving interference to the reception device from among previous RUs based on an RU corresponding to a current resource allocation start position in a D2D communication system according to an embodiment of the present disclosure.

FIG. 21 illustrates a control flow in which the reception device discovers an RU giving interference to the reception device in the D2D communication system according to an embodiment of the present disclosure.

Referring to FIG. 21, the reception device discovers an RU giving interference to the reception device from among previous RUs based on the RU corresponding to the current resource allocation start position. The RU giving the interference to the reception device from among the previous RUs may be considered as being used by another link. Discovering the previous RU ($RU_{prev}$) from among the previous RUs refers to discovering a link giving interference to a link configured by the reception device from among the previous links. Discovering the previous RU is determining the resource allocation start position $RU_{prev}$ in previous transmission.

The reception device configures the current resource allocation start in its own link as "m" in step 2100. The reception device measures interference ($I_m$) in an mth link and calculates a SIR in a previous link ($SIR_{prev}$) by the measured interference ($I_m$) and a strength (S) of a received signal.

The interference ($I_m$) in the mth link may be calculated by, $$\sum_{l \text{ selects } m^{th} RU} I_l$$

and the SIR in the previous link ($SIR_{prev}$) may be calculated by $S/I_m$.

The reception device determines whether the calculated SIR in the previous link ($SIR_{prev}$) is larger than or equal to a preset threshold ($\tau$). The reception device determines whether interference by a signal in the previous link of the current link, that is, in the previous RU is ignored by the calculated SIR in the previous link ($SIR_{prev}$).

When the calculated $SIR_{prev}$ is not larger than or not equal to the preset threshold ($\tau$), the reception device determines that interference in the corresponding RU can be ignored and determines a slot index currently corresponding to m as $RU_{prev}$ in step 2112.

When the calculated $SIR_{prev}$ is larger than or equal to the preset threshold ($\tau$), the reception device updates m to select a next RU ahead of the RU currently corresponding to m in step 2106. Updating m to select the next RU may be performed by "(m−1)% M". Using a modulo operation is because it is assumed that slot indexes are allocated by a circular structure.

The reception device determines whether interference generated in all RUs are identified. The reception device may determine whether the interference is generated in all RUs by whether updated m is $RU_{start}$.

When interference in all RUs is not identified, the reception device calculates SIR in the RU corresponding to the updated m ($SIR_{prev}$).

When the interference in all RUs is identified, the reception device determines that there is no RU giving interference to the reception device from among previous RUs and does not determine $RU_{prev}$ in step 2110.

Figure 22:
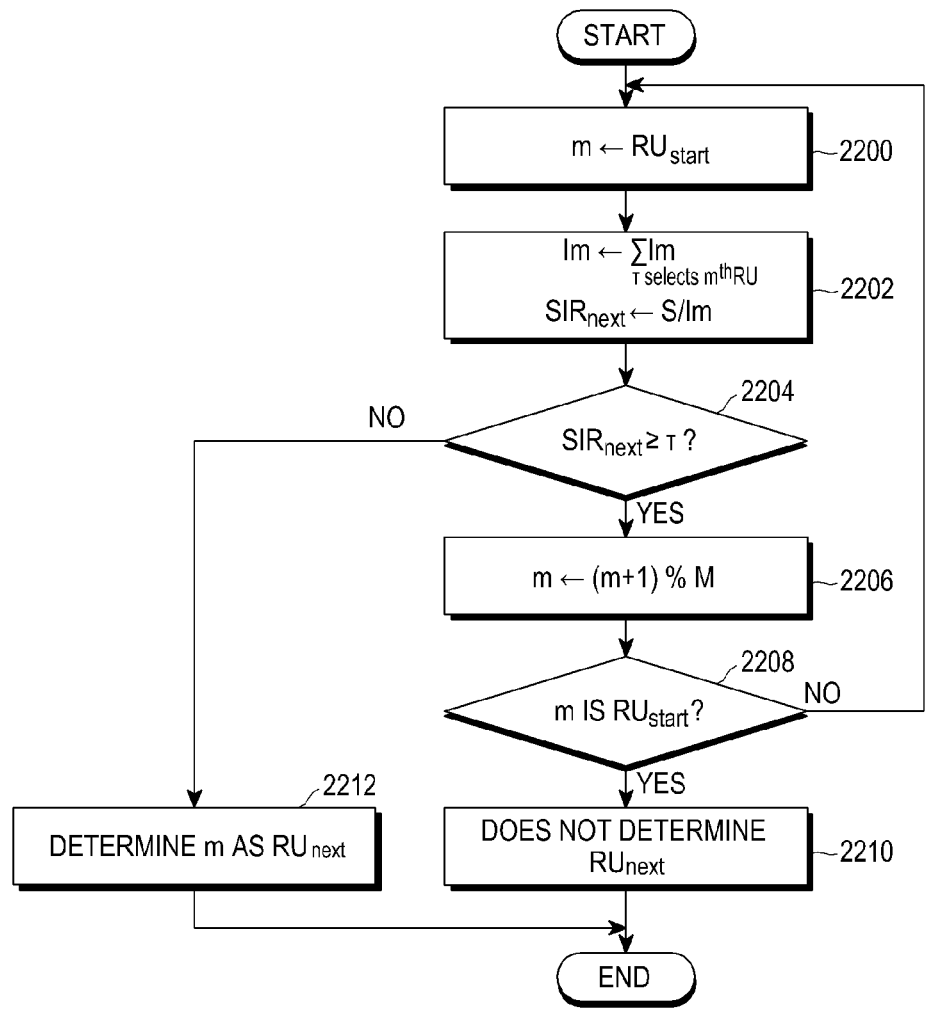
FIG. 22 illustrates a control flow in which a reception device discovers an RU giving interference to the reception device from among next RUs based on an RU corresponding to a current resource allocation start position in a D2D communication system according to an embodiment of the present disclosure.

FIG. 22 illustrates a control flow in which the reception device discovers an RU giving interference to the reception device in the D2D communication system according to an embodiment of the present disclosure.

Referring to FIG. 22, the reception device discovers an RU giving interference to the reception device from among next RUs based on the RU corresponding to the current resource allocation start position. The RU giving the interference to the reception device from among the next RUs may be considered as being used by another link Discovering the next RU ($RU_{next}$) from among the next RUs refers to discovering a link giving interference to a link configured by the reception device from among the next links. Discovering the next RU is determining the resource allocation start position $RU_{next}$ in previous transmission.

The reception device configures the current resource allocation start in its own link as "m" in step 2200. The reception device measures interference ($I_m$) in an mth link and calculates a SIR in the next link ($SIR_{next}$) by the measured interference ($I_m$) and a strength (S) of a received signal.

The interference ($I_m$) in the mth link may be calculated by, $$\sum_{l \text{ selects } m^{th} RU} I_l$$

and the SIR ($SIR_{next}$) in the next link may be calculated by $S/I_m$.

The reception device determines whether the calculated SIR in the next link ($SIR_{next}$) is larger than or equal to a preset threshold (τ) in step 2204. The reception device determines whether interference by a signal in the next link of the current link, that is, in the next RU is ignored by the calculated SIR in the next link ($SIR_{next}$).

When the calculated $SIR_{next}$ is not larger than or not equal to the preset threshold (τ), the reception device determines that interference in the corresponding RU can be ignored and determines a slot index currently corresponding to m as $RU_{next}$ in step 2212.

When the calculated $SIR_{next}$ is larger than or equal to the preset threshold (τ), the reception device updates m to select a next RU ahead of the RU currently corresponding to m in step 2206. Updating m to select the next RU may be performed by "(m+1)% M". Using a modulo operation is because it is assumed that slot indexes are allocated by a circular structure.

The reception device determines whether interference generated in all RUs are identified. The reception device may determine whether the interference is generated in all RUs by whether updated m is $RU_{start}$.

When interference in all RUs is not identified, the reception device calculates SIR in the RU corresponding to the updated m ($SIR_{next}$).

When the interference in all RUs is identified, the reception device determines that there is no RU giving interference to the reception device from among the next RUs and does not determine $RU_{next}$ in step 2210.

An operation in a case where the reception device uses a bit for informing of whether to allocate the next slot and a case where the reception device does not use the bit will be described below. When the bit for informing of whether to allocate the next slot is not used, a resource information response message additionally includes the number of allocation resources ($RU_{assigned}$).

In the following description, a "start resource index" is used as the same meaning of the above used "RU index in the resource allocation start position ($RU_{start}$)", a "resource demand amount" is used as the same meaning of the above used "resource allocation demand amount ($RU_{demand}$)", and a "adjusted resource index" is used as the same meaning of the above used "resource allocation start position to be changed ($RU_{adjusted}$)" and "start position information of resources to be allocated ($RU_{adjusted}$)".

Figure 23:
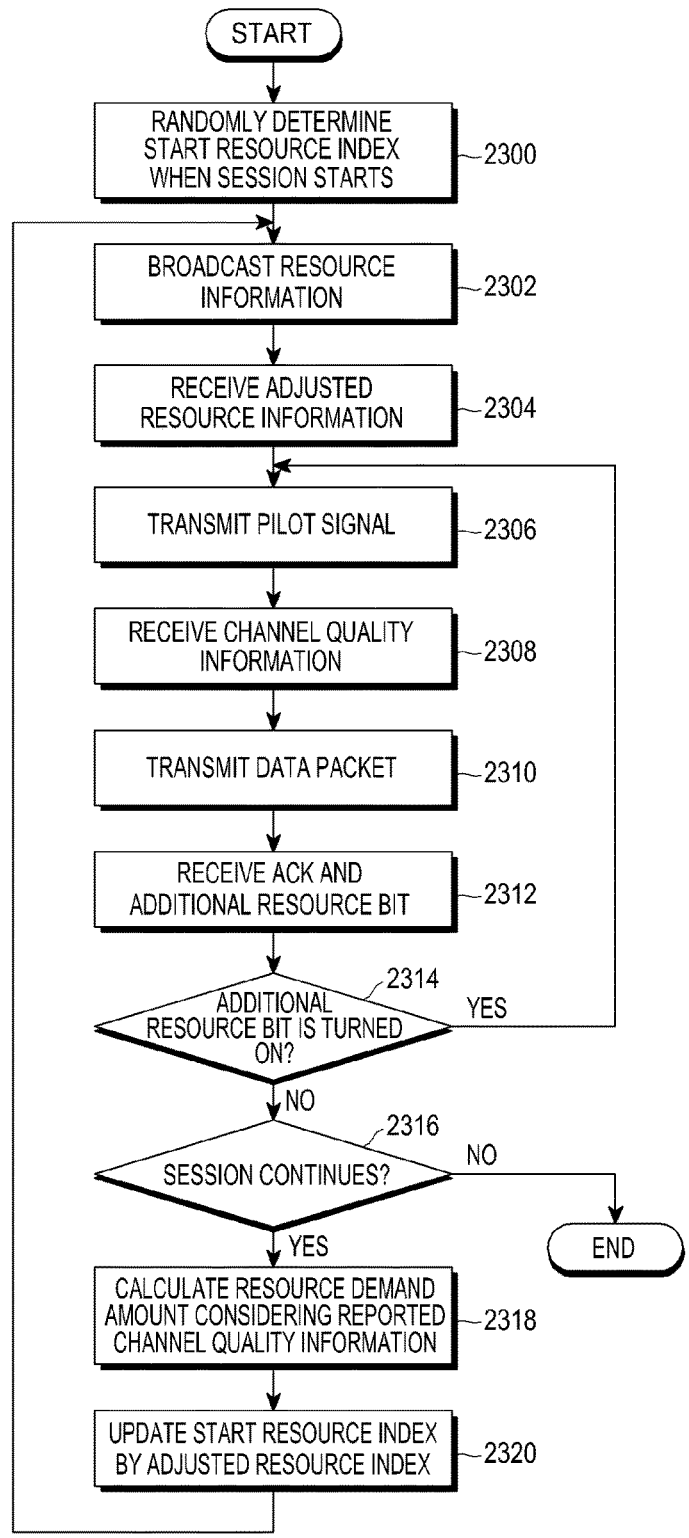
FIG. 23 illustrates a control flow performed by a transmission device for distributed scheduling in a D2D communication system according to a first embodiment of the present disclosure.

FIG. 23 illustrates a control flow in which the transmission device performs distributed scheduling by using the bit for informing of whether to allocate the next slot in the D2D communication system according to an embodiment of the present disclosure.

Referring to FIG. 23, the transmission device configures a link with the reception device for the D2D communication. The transmission device randomly determines a start resource index when a new session starts on the configured link in step 2300. The transmission device may consider a status of a link corresponding to a newly started session when the start resource index according to the start of the new session is randomly determined.

The transmission device configures resource information including the start resource index and the resource allocation amount and broadcasts the configured resource information in step 2302. The broadcasted resource information will be received by an unspecified multitude of reception devices. The unspecified multitude of reception devices refer to reception devices located within a range in which the resource information broadcasted by the transmission device can be received.

Examples of the resource information configured by the transmission device and a resource information request message broadcasting the resource information are illustrated in FIGS. 7, 9, 10, and 14.

The resource information includes both initial resource information and updated resource information. The initial resource information refers to resource information including a start resource index and a resource allocation amount determined when the session starts. The updated resource information refers to resource information including a start resource index and a resource allocation amount updated in consideration of a channel status changed in a state where the session starts and thus data transmission is made.

The transmission device receives adjusted resource information including an adjusted resource index from the counterpart reception device in step 2304. The adjusted resource information may be received by a resource information response message as illustrated in FIGS. 8, 9, 11, and 15.

The adjusted resource index included in the adjusted resource information may further include a resource allocation amount or indexes of resources to be allocated in addition to a resource allocation start position to be changed (RU$_{adjusted}$) or modified start position information of resources to be allocated (RU$_{adjusted}$).

The transmission device transmits a pilot signal to measure a downlink channel status in step 2306. The pilot signal transmitted by the transmission device may be received by an unspecified multitude of reception devices located within an arrival distance determined by transmission power of the pilot signal.

The transmission device receives channel quality information, that is, CQI measured based on the transmitted pilot signal in step 2308. The CQI will be reported by the counterpart reception device configuring a link through which the transmission device performs the D2D communication. The transmission device may receive the CQI also from a neighboring reception device having received the transmitted pilot signal as well as the counterpart reception device. The neighboring device may be a reception device configuring a D2D communication link adjacently existing.

Figure 19:
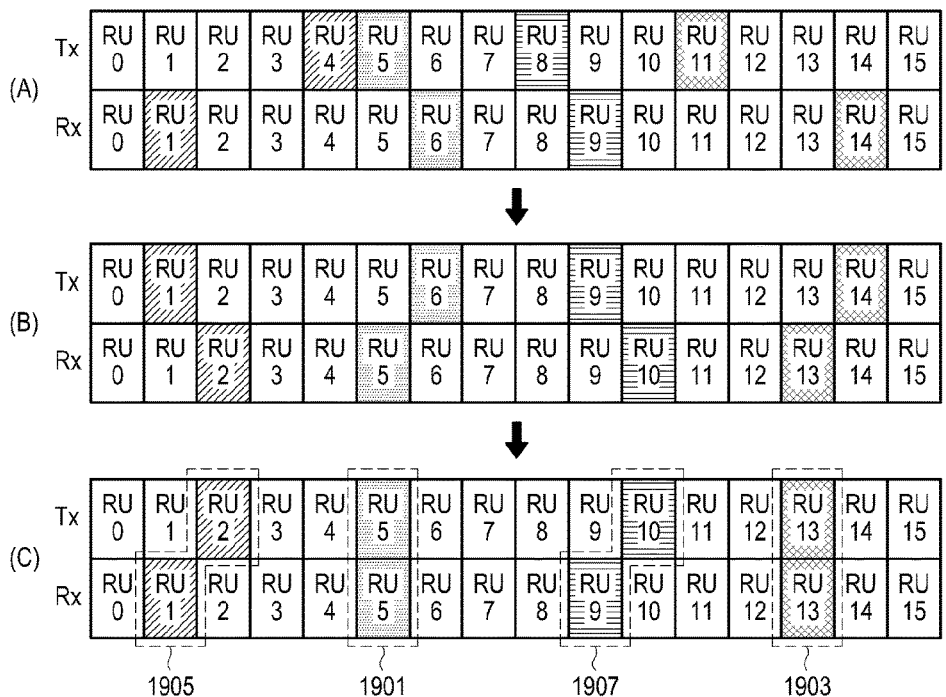
FIG. 19 illustrates an example of a resource allocation process converging when a method of performing distributed scheduling on resources is repeatedly performed according to an embodiment of the present disclosure.
Figure 20:
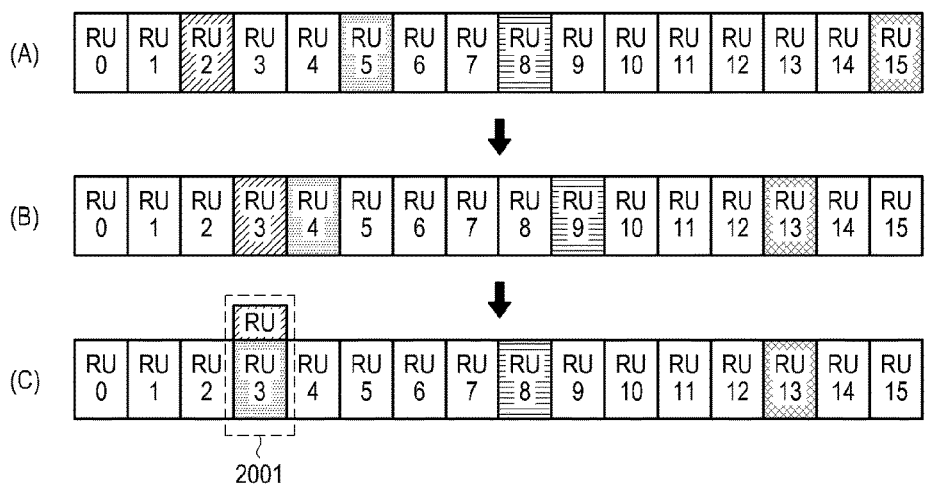
FIG. 20 illustrates an example of improvement of a frequency re-use rate in a method of performing distributed scheduling on resources according to an embodiment of the present disclosure.

The transmission device transmits a data packet to the counterpart reception device based on resource information in step 2310. The transmission device transmits the data packet by the start resource index and the resource demand amount included in the resource information. That is, the transmission device transmits the data packet in time slots as much as the demand amount from a time slot corresponding to the start resource index as illustrated in FIGS. 19 and 20.

The transmission device receives ACK and an additional resource bit from the counterpart reception device in response to the transmitted data packet in step 2312. When the data packet transmitted by the transmission device is not normally transmitted to the counterpart reception device, the transmission device may not receive the ACK and the additional resource bit.

The counterpart reception device uses the additional resource bit to inform the transmission device that a next slot is allocated for the data transmission. For example, when the additional resource bit is turned "on", it means that the next slot for the D2D communication is allocated by the counterpart reception device. For example, when the additional resource bit is turned "off", it means that the next slot for the D2D communication is allocated by the counterpart reception device.

The transmission device determines whether the next slot is allocated for the D2D communication by identifying a configuration status of the received additional resource bit in step 2314. When the received additional resource bit is in an "on" status, the transmission device performs an operation for next data transmission in steps 2306 to 2312. When the received additional resource bit is in an "off" status, the transmission device terminates the data transmission by the resource information.

The transmission device determines whether a started session is continuously maintained in step 2316. When the session is not continuously maintained, the transmission device terminates all operations for the D2D communication by determining that no more D2D communication is required.

When the session is continuously maintained, the transmission device updates the existing resource information to continuously perform the D2D communication in steps 2318 and 2320.

The transmission device calculates a resource demand amount in consideration of the reported CQI. The calculation of the resource demand amount may be performed by Equation (1) defined above. That is, the resource demand amount is calculated by a result value generated by applying an instantaneous transmission rate $\hat{R}$ in each RU allocated by the scheduling based on the reported CQI and an average transmission rate ($\overline{R}$) calculated for all allocation RUs to a predetermined function (F(·)).

The transmission device updates a start resource index in a next data transmission interval by the adjusted resource index included in the adjusted resource information received from the counterpart reception device in step 2320. The adjusted resource index may be a start resource index to be applied to the next data transmission interval.

When the resource demand amount is calculated and the start resource index is updated, the transmission device broadcasts resource information configured by the calculated resource demand amount and the updated start resource index in step 2302. Since the next operations are the same as the preceding, a description thereof will be omitted.

That is, the transmission device starts a session on a link configured for D2D communication and transmits data by using resource information broadcasted while allocation of the next slot is maintained in a state where the session continues. When the allocation of the next slot is not maintained, the resource information is updated by the resource demand amount calculated by the CQI measured in data transmission and the start index corresponding to the adjusted resource index provided by the counterpart reception device. The transmission device transmits data by using the updated resource information until the allocation of the next slot is maintained in a state where the session continues.

The transmission device repeatedly performs an operation of changing the start resource position and the resource allocation amount in the state where the session continues, so as to perform scheduling which minimizes the influence of interference.

Figure 24:
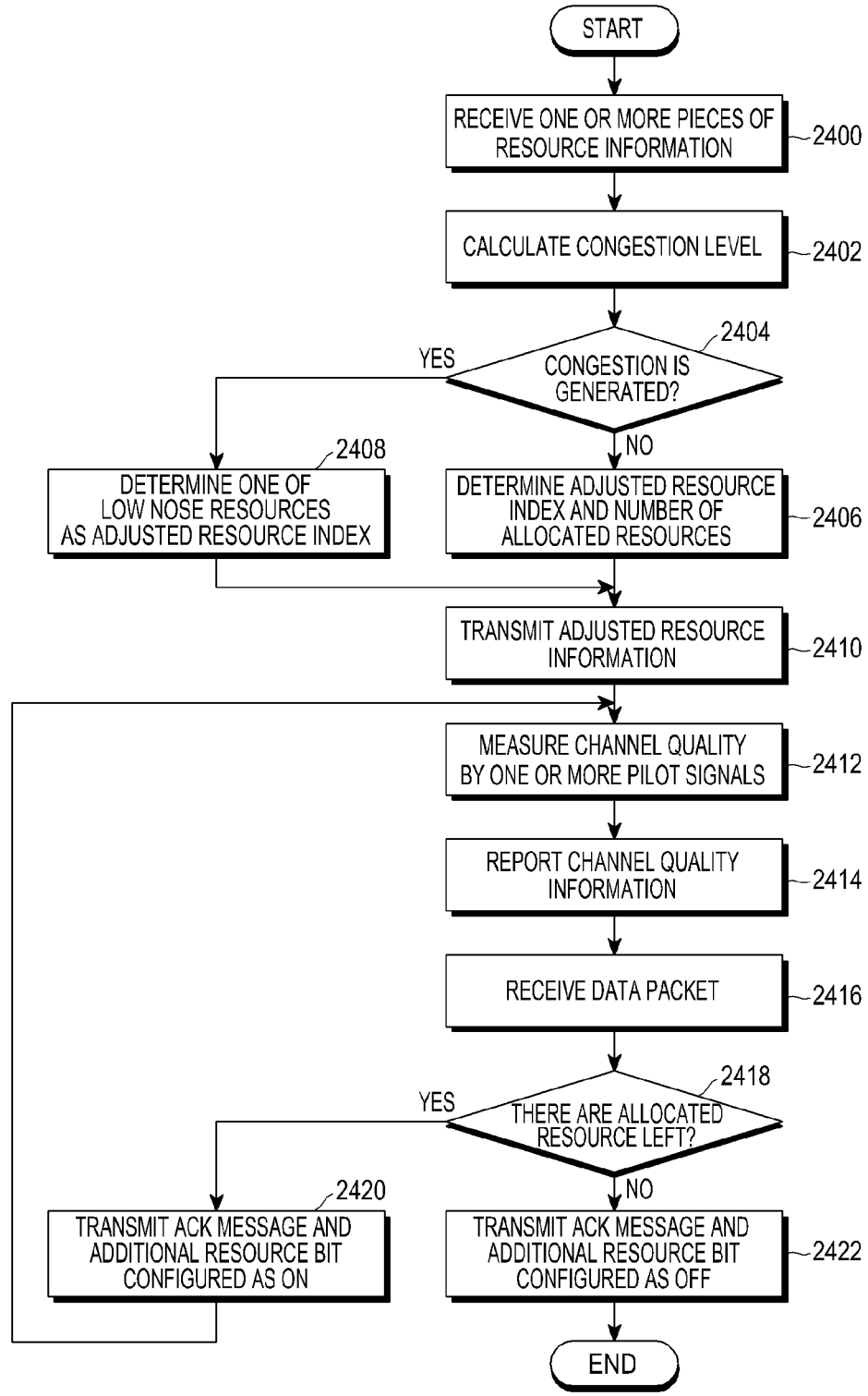
FIG. 24 illustrates a control flow performed by a reception device for distributed scheduling in a D2D communication system according to the first embodiment of the present disclosure.

FIG. 24 illustrates a control flow in which the reception device performs distributed scheduling by using a bit for informing of whether to allocate the next slot in the D2D communication system according to an embodiment of the present disclosure.

Referring to FIG. 24, the reception device receives one or more pieces of resource information in step 2400. The one or more pieces of resource information includes neighboring resource information transmitted by an unspecified multitude of transmission devices as well as self resource information transmitted by a counterpart transmission device. The unspecified multitude of transmission devices refers to transmission devices located within a range in which resource information can be received by the reception device.

A resource information request message including the resource information may identify a link corresponding to a link ID. Identifying the link is considered as identifying a transmission device having transmitted the resource information request message.

The reception device may distinguish whether one or more pieces of received resource information is self resource information or neighboring resource information. The reception device can identify which adjacent transmission device has transmitted the neighboring resource information.

The reception device measures congestion of desired resources in a desired link and calculates a congestion level based on the measured congestion in step 2402. Calculating the congestion level is to determine whether a re-configuration of the start resource index is required. That is, when the congestion in one or more RUs allocated by the current self resource information exceeds a predetermined reference, the reception device re-configures a start position of resources to be allocated, that is, a start resource position.

When the start resource position is re-configured, the reception device may perform D2D communication by using another RU.

As the number of links participating in the D2D communication, there may be a lack of resources to be allocated. When interference by neighboring links is serious in an RU adjacent to the start resource index ($RU_{start}$), a situation where resources to be allocated ($RU_{assigned}$) do not exist may occur. When such generation of the congestion is recognized, it is required to re-configure the start resource index ($RU_{start}$) such that the D2D communication by another resource is performed.

In order to recognize the congestion, an estimated value ($\hat{P}_i$) of the congestion level may be defined by Equation (8) below.

MathFigure 8
$$\hat{P}_i = \sum_{k=0}^{K-1} P_{i,k}$$ [Math. 8]

i denotes an RU index,
k
  denotes a link index, and
$P_{i,k}$
  denotes a reception power strength estimated in a
k
  th link in an i th RU.
The estimated value ($\hat{P}_i$)
  of the congestion level defined by Equation (8) above is defined by a result value generated by adding up reception power strengths estimated in the i th RU of each link. The congestion level ($\hat{P}_{RU_{start}}$)
  in the start resource index ($RU_{start}$)
  included in the self resource information reported by the counterpart transmission device may be estimated by a sum of reception signal strengths estimated for each link after i is configured as the start resource index ($RU_{start}$).
The reception device determines whether the congestion is generated in the RU corresponding to the start resource index ($RU_{start}$)
  in consideration of the calculated congestion level in the start resource index ($RU_{start}$)
  in step 2404. Whether the congestion is generated may be determined by a comparison of identifying whether the congestion level in the start resource index ($RU_{start}$)
  is larger than a preset reference (threshold).

Equation (9) below shows a condition for determining whether the congestion is generated by the comparison between the congestion level ($\hat{P}_{RU_{start}}$)
  in the start resource index ($RU_{start}$)
  and the predetermined reference (threshold).
MathFigure 9

$$\hat{P}_{RU_{start}} > \text{Min}(\hat{P}_{RU_{start}}) + \alpha \cdot (\text{Max}(\hat{P}_{RU_{start}}) - \text{Min}(\hat{P}_{RU_{start}}))$$ [Math.9]

In Equation (9), the congestion state is determined only when a reception power value ($\hat{P}_{RU_{start}}$)
  in the start resource index ($RU_{start}$)
  is larger than a predetermined power value. The predetermined power value is determined by a proper rate ($\alpha$) between minimum reception power ($\text{Min}(\hat{P}_{RU_{start}})$)
  and maximum reception power ($\text{Max}(\hat{P}_{RU_{start}})$).
According to an experiment, it is preferable that 0.5 is selected as the proper rate ($\alpha$).

The reception power value ($\hat{P}_{RU_{start}}$)
  is provided by the transmission device of the corresponding link, that is, the counterpart transmission device.
When it is determined that the congestion state is generated, the reception device determines one of the low noise resources as the adjusted start resource index in step 2408. When the reception device almost reaches the congestion state, the reception device calculates a saltatory start resource index ($RU_{adjusted}$)
  by re-configuring the resources without passing through a calculation process for gradually reaching a target start resource index ($RU_{adjusted}$).
Equation (10) below defines the saltatory start resource index ($RU_{adjusted}$).
MathFigure 10

$$m \in [\forall i | P_i \leq \text{Min}(\hat{P}_i) + \beta \cdot (\text{Max}(\hat{P}_i) - \text{Min}(\hat{P}_i))]$$ [Math.10]

With respect to an RU index
i
  to be newly configured, which is defined in Equation (9) above, m is selected from all
i
  having reception power lower than a predetermined power value. The predetermined power value may be determined by a proper rate ($\beta$)
  between minimum reception power and maximum reception power. According to an experiment, it is preferable that 0.1 is selected as the proper rate ($\beta$).
The proper rate
$\beta$
  should be smaller than the above defined proper rate
$\alpha$.
When it is determined that the congestion state is not generated, the reception device configures the adjusted resource information by using one or more pieces of received resource information in step 2406. The reception device adjusts the start resource index by using the one or more pieces of received resource information and determines the number of allocated resources. The reception device adjusts the start resource index and considers neighboring resource information when determining the number of allocated resources. By considering the neighboring resource information, collision with resources allocated to adjacent links can be prevented. That is, the reception device may adjust resources to be allocated such that the collision with resources allocated to the adjacent links is avoided.

The reception device may configure the adjusted resource information by the adjusted start resource index and/or the number of determined resources to be allocated. The reception device may adjust the start resource index by Equation (2) defined above.

The reception device transmits the adjusted self resource information to the counterpart transmission device in step 2410. The reception device may identify the corresponding link by a link ID included in the received resource information request message. Accordingly, the reception device may add the adjusted self resource information into a response information response message to be transmitted to the counterpart transmission device as the link ID.

The reception device may also transmit the adjusted self resource information to an adjacent transmission device as well as the counterpart transmission device as necessary.

The reception device measures a downlink channel status by one or more received pilot signals in step 2412. The one or more received pilot signals are pilot signals transmitted by the counterpart transmission device and the adjacent transmission device. When the channel quality is the SINR, the reception device may measure an SINR corresponding to the counterpart transmission device by a received signal strength (received signal strength) measured by the pilot signal transmitted by the counterpart transmission device, a received signal strength (interference signal strength) measured by the pilot signals transmitted by one or more adjacent transmission devices, and a measured noise strength.

The reception device reports CQI configured based on the measured channel quality to the counterpart transmission device in step 2414. CQI measured for the counterpart transmission device may be also provided to the adjacent transmission device as necessary.

The reception device receives a transmitted data packet by using resource information received from the counterpart transmission device in step 2416. The reception device determines whether there are the remaining allocated resources in step 2418. That is, the reception device determines whether resource allocation for next transmission is required.

When there are the allocated resources left, the reception device turns on an additional resource bit to indicate that an ACK signal responding to the received data packet and the resources for the next transmission are allocated and transmits the additional resource bit to the transmission device in step 2420. The reception device repeatedly performs steps 2412 to 2416.

When there are no allocated resources left, the reception device turns off the additional resource bit to indicate that the ACK signal responding to the received data packet and the resources for the next transmission are not allocated and transmits the additional resource bit to the transmission device in step 2422. The reception device terminates the session started for the D2D communication.

Figure 25:
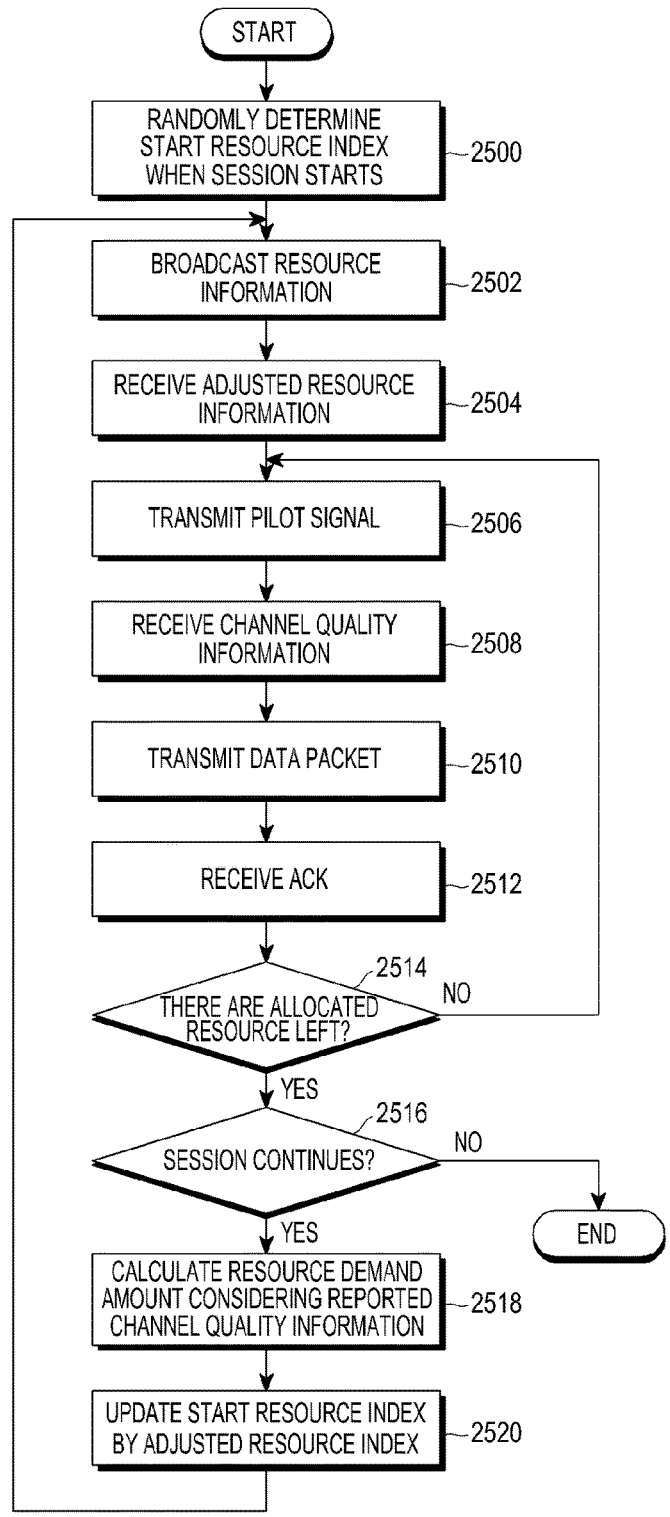
FIG. 25 illustrates a control flow performed by a transmission device for distributed scheduling in a D2D communication system according to a second embodiment of the present disclosure.

FIG. 25 illustrates a control flow in which the transmission device performs distributed scheduling without using a bit for informing of whether to allocate the next slot in the D2D communication system according to an embodiment of the present disclosure.

Some of the operations (2504, 2512, and 2514) of the control flow illustrated in FIG. 25 are different from the operations of the control flow illustrated in FIG. 23, and most operations (the remaining steps) are the same.

More specifically, the reception of the adjusted self resource information from the counterpart reception device by the transmission device is the same in step 2504. However, it is different in that the adjusted self resource information includes the number of resources allocated by the counterpart reception device.

The operation in which the transmission device transmits the pilot signal and then receives the CQI in response to the pilot signal, and transmits the data packet and then receives the ACK signal in response to the data packet is the same. However, since the additional resource bit to indicate whether to allocate the next slot is not used, the transmission device only receives the ACK signal and does not receive the additional resource bit, which is different in step 2512.

The transmission device does not receive the additional resource bit, so that it is determined if there are allocated resource left without determining whether the additional resource bit is in an on state or an off state in step 2514. When it is determined that there are the allocated resources left, the transmission device repeatedly transmit the pilot signal and the data packet.

However, when it is determined that there are no allocated resources left, the transmission device identifies a maintenance state of the session and additional performs an operation according to a result thereof. That is, when the session is maintained, the transmission device calculates a resource demand amount in consideration of the reported CQI in step 2518. The transmission device updates a start resource index by a adjusted resource index in step 2520.

The transmission device repeatedly performs a scheduling operation of changing the resource position or resource amount until the session started for the D2D communication is continuously maintained.

Figure 26:
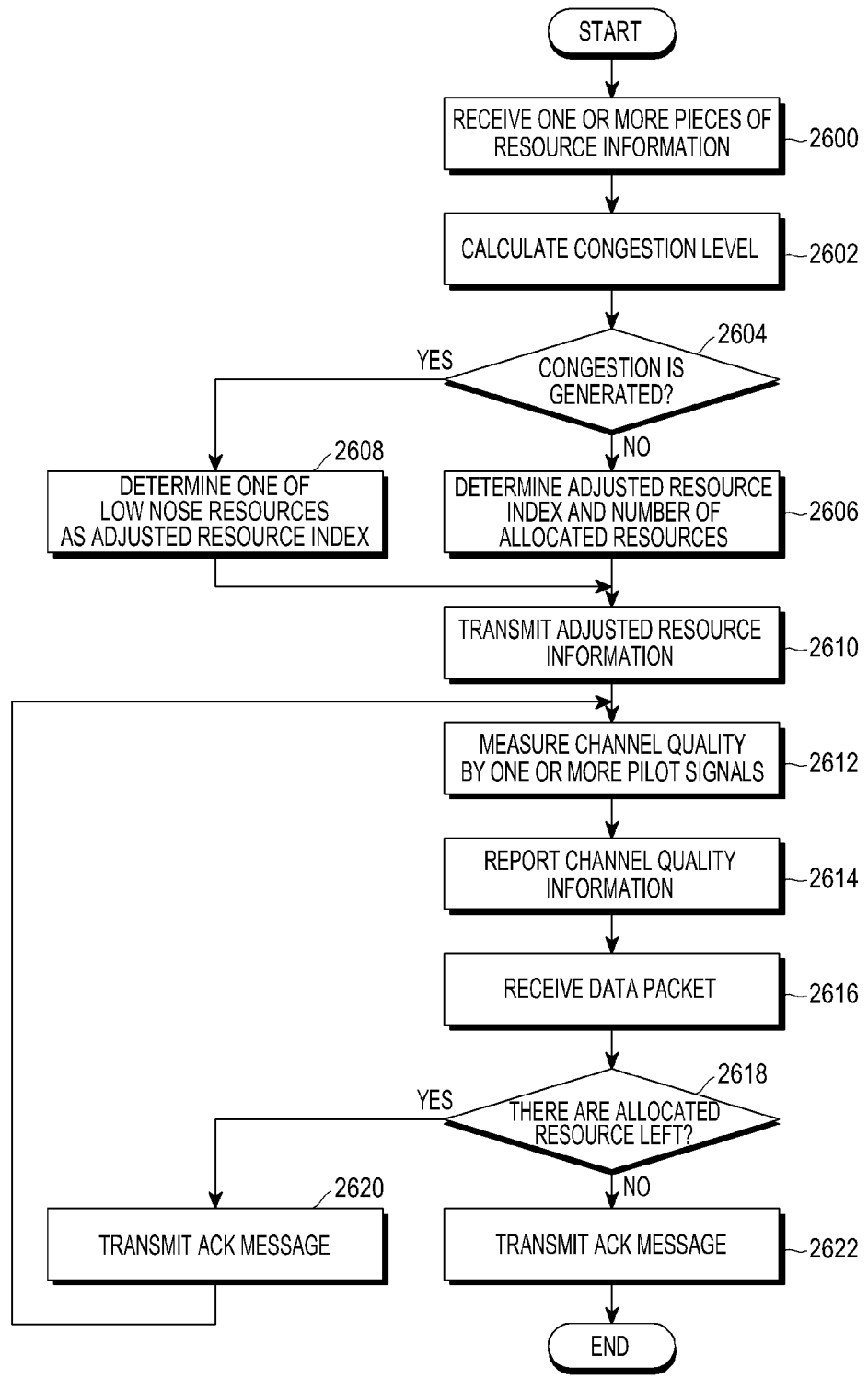
FIG. 26 illustrates a control flow performed by a reception device for distributed scheduling in a D2D communication system according to the second embodiment of the present disclosure.

FIG. 26 illustrates a control flow in which the reception device performs distributed scheduling without using a bit for informing of whether to allocate the next slot in the D2D communication system according to an embodiment of the present disclosure.

Some of the operations (2620 and 2622) of the control flow illustrated in FIG. 26 are different from the operations of the control flow illustrated in FIG. 24, and most operations (the remaining steps) are the same.

More specifically, the reception device receives the data packet from the counterpart transmission device and then determines whether there are allocated resources left, so as to determine whether to repeatedly perform an operation for measuring a channel status and receiving a data packet.

The reception device transmits only an ACK signal responding to the received data packet to the counterpart transmission device regardless of whether there are allocated resources left. That is, the operation of transmitting the additional resource bit configured according to the existence or non-existence of the allocated resources left to the counterpart transmission device is not performed.

The embodiment of the present can use a frequency band which is not allowed like a WLAN as well as a frequency band which is allowed to perform wireless communication. When apply the not allowed frequency band, device is perform sensing and back-off before transmit a resource request message and a resource response message.

The device is performing sensing in a data transmission section (assigned RU) determined based on the resource request message and the resource response message. If a determine interference by the sensing, the device not transitions data.

If not assigned RU or not received the resource request message and the resource response message, the device has priority less than priority of a device assigned with RU use to the resource request message and the resource response message.

Figure 27:
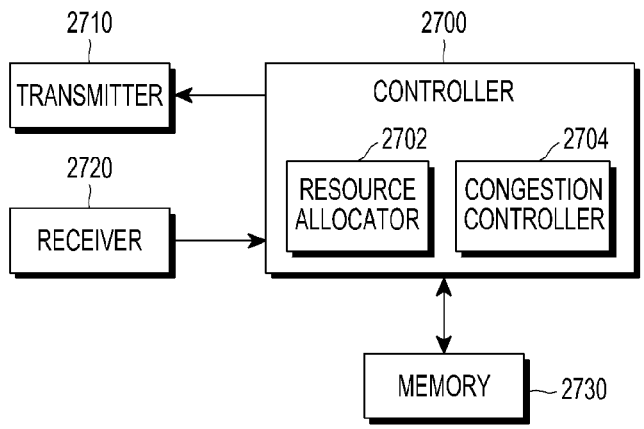
FIG. 27 is a block diagram illustrating a device performing distributed scheduling in a D2D communication system according to an embodiment of the present disclosure.

FIG. 27 is a block diagram illustrating a device performing the distributed scheduling in the D2D communication system according to an embodiment of the present disclosure.

Referring to FIG. 27, it is premised that a configuration of the device can perform all operations of the reception device as well as operations of the transmission device. However, when the corresponding device operates as only the transmission device or the reception device, it is apparent that the corresponding device can be implemented only by components required for the corresponding operations.

When the device operates as the transmission device, a transmitter 2710 transmits a resource information request message including self resource information through broadcasting by a control of a controller 2700. The transmitter 2710 transmits a pilot signal by a control of the controller 2700. The transmitter 2710 transmits RUs as many as resource allocation demand amounts ($RU_{demand}$), starting data transmission from an RU corresponding to a resource allocation start position ($RU_{start}$) included in the self resource information by a control of the controller 2700.

A receiver 2720 receives a resource information response message and CQI transmitted by a counterpart device and transmits the received resource information response and CQI to the controller 2700. The receiver 2720 receives an ACK signal corresponding to each of data transmitted in RUs as many as resource allocation demand amounts ($RU_{demand}$) from the resource allocation start position ($RU_{start}$) and transmits the received ACK signal to the controller 2700. When an additional resource bit is provided from the counterpart device together with the ACK signal, the receiver 2720 receives the ACK signal and the additional resource bit and transmits them to the controller 2700.

The controller 2700 configures self resource information by an initially determined resource allocation start position ($RU_{start}$) and resource allocation demand amount ($RU_{demand}$) and perform a control for broadcasting through the transmitter 2710. When it is determined that there are no allocated resources left, the controller 2700 updates the existing self resource information. When the additional resource bit provided from the counterpart device is turned "off", the controller 2700 determines that there are no allocated resources left and updates the existing self resource information. When the additional resource bit is not provided from the counterpart device, the controller 2700 determines whether there are resources left whenever data is received. When there are no resources left, the controller 2700 may update the existing self resource information.

In order to update the existing self resource information, the controller 2700 calculates a new resource allocation demand amount ($RU_{demand}$) in consideration of CQI from the counterpart device transmitted through the receiver 2720. The controller 2700 makes a change to a new resource allocation start position ($RU_{start}$) by self resource information adjusted by the counterpart device (for example, adjusted resource allocation start position ($RU_{adjusted}$)) transmitted through the receiver 2720.

As described above, the controller 2700 having updated the existing self resource information repeatedly performs a control for transmitting data by using the updated self resource information.

When the device operates as the transmission device, most operations performed by the controller 2700 are executed by a resource allocator 2702 included in the controller 2700.

When the device operates as the reception device, the receiver 2720 receives a resource information request message broadcasted by the counterpart device and the adjacent device and transmits the received resource information request message to the controller 2700 by a control of the controller 2700. The receiver 2720 receives a pilot signal transmitted by the counterpart device and the adjacent device, measures a signal strength according to the reception of the pilot signal, and provides a result thereof to the controller 2700 by a control of the controller 2700. The receiver 2720 receives data transmitted by the counterpart device in RUs as many as the resource allocation demand amount ($RU_{demand}$) from the RU corresponding to the resource allocation start position ($RU_{start}$) included in the self resource information and transmits the received data to the controller 2700 by a control of the controller 2700.

The transmitter 2710 transmits a resource information response message and CQI to the counterpart device by a control of the controller 2700. The resource information response message includes self resource information adjusted by the controller 2700 (for example, adjusted resource allocation start position ($RU_{adjusted}$)).

The transmitter 2510 transmits an ACK signal corresponding to each of data received in RUs as many as the resource allocation demand amount ($RU_{demand}$) from the resource allocation start position ($RU_{start}$) to the counterpart device by a control of the controller 2700.

The transmitter 2510 may transmit an additional resource bit to the counterpart device together with the ACK signal when the controller 2700 exists.

The controller 2700 collect self resource information and one or more pieces of neighboring resource information from the resource information request message received from the counterpart device and the adjacent device received through the receiver 2720. The controller 2700 generate adjusted self resource information by adjusting the collected self resource information to avoid collision between links in consideration of the collected one or more pieces of neighboring resource information.

The controller 2700 configures a resource information response message including the generated adjusted self resource information and controls the transmitter 2710 to transmit the configured resource information response message to the counterpart device.

The controller 2700 measures downlink channel quality by using a reception signal strength of the pilot signals of the counterpart device and the adjacent device received through the receiver 2720. The controller 2700 may measure an instantaneous transmission rate $\hat{R}$ in resources allocated by the scheduling as the channel quality. The controller 2700 generates CQI based on the measured channel quality and controls the transmitter 2710 to transmit the generated CQI to the counterpart device.

The controller 2700 controls the receiver 2720 to receive data transmitted from the counterpart device in RUs as many as the resource allocation demand amount ($RU_{demand}$) from the resource allocation start position ($RU_{start}$) by using the self resource information received from the counterpart device.

The controller 2700 processes the data received through the receiver 2720 and controls the transmitter 2710 to transmit the ACK signal as a result thereof. The controller 2700 may configure the additional resource bit as "on" or "off" according to whether there are allocated resources left and control the transmitter 2710 to transmit the configured additional resource bit to the counterpart device together with the ACK signal.

The controller 2700 may include a resource allocator 2702 and a congestion controller 2704. In this case, the resource allocator 2702 performs general controls for gradually changing the resource allocation start position ($RU_{start}$) to the resource allocation start position ($RU_{adjusted}$) which is the final target. The resource allocator 2702 performs general controls for determining the resource allocation start position to be adjusted ($RU_{assignment}$) by using the neighboring resource information collected from the adjacent device.

The congestion controller 2704 identifies the congestion in each RU and determines whether the congestion in the RU which the congestion controller 2704 uses is larger than a preset threshold reference. Then, the congestion controller 2704 performs general controls for determining a new resource allocation start position ($RU_{adjusted}$) to be changed in consideration of a result thereof.

A memory 2730 stores a program, data and the like required for supporting the D2D communication by a control of the controller 2700 and outputs the stored program, data and the like by a control of the controller 2700. The memory 2730 stores various pieces of information required for supporting the distributed scheduling and outputs required information by a request of the controller 2700.

Figure 28:
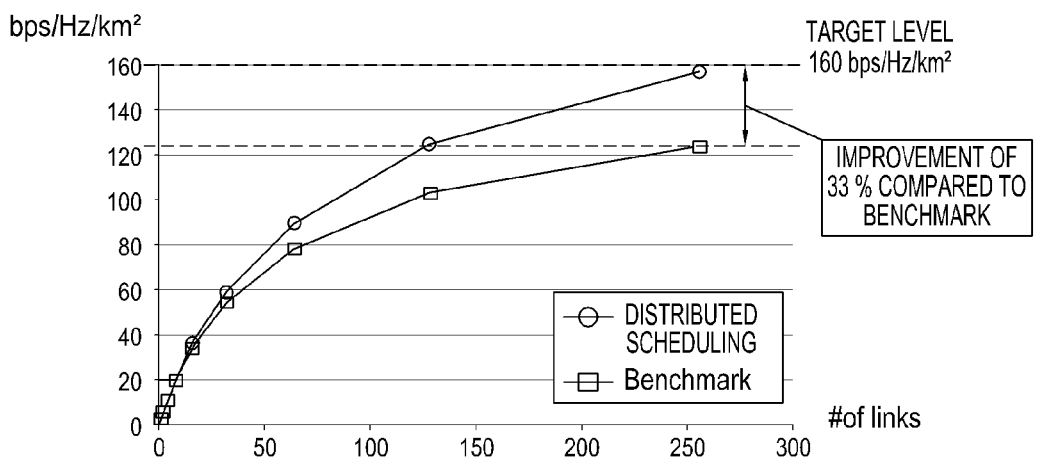
FIG. 28 illustrates experiment results of a distributed scheduling technology provided by an embodiment of the present disclosure.

FIG. 28 illustrates experiment results of the distributed scheduling technology provided by an embodiment of the present disclosure.

FIG. 28 shows an improved capability compared to a technology applied to a benchmark system corresponding to the existing technology by the provided distributed scheduling. For example, in a particular environment where a link length is 20 meters (m), throughput is approximately improved by 33 percentages (%).

Meanwhile, although the exemplary embodiments of the present disclosure have been illustrated and described, the present disclosure is not limited thereto. It is apparent that various modified implementations can be made by those skilled in the art without departing from the scope of the present disclosure claimed by the claims and the modified implementations should not be construed separately from the technical idea or view of the present disclosure.

The invention claimed is:

1. A method of performing distributed scheduling by a reception device configuring a target link corresponding to one of a plurality of links in a communication network, the method comprising:
adding up resource allocation demand amounts included in resource information broadcasted by a counterpart transmission device configuring the target link and one or more adjacent transmission devices by a preset Resource Unit (RU);
adjusting self-resource information in consideration of resource position information included in the broadcasted resource information and the added resource allocation demand amount and transmitting the adjusted self-resource information to the counterpart transmission device;
measuring channel quality by a pilot signal received from the counterpart transmission device until data transmission using resources determined based on a predetermined distributed scheduling rule of the broadcasted resource information is performed; and
feeding back channel quality information according to the measurement to the counterpart transmission device.

2. The method of claim 1, wherein the broadcasted resource information includes link identification information, a resource allocation start position, and a resource allocation demand amount.

3. The method of claim 2, wherein the adjusted resource information includes at least one of an adjusted resource allocation start position, an adjusted resource allocation demand amount, or link identification information.

4. The method of claim 1, further comprising transmitting a response signal according to a reception of data transmitted from the counterpart transmission device and an additional resource bit indicating whether there are resources left in all resources corresponding to the resource allocation demand amount included in the adjusted resource information to the counterpart transmission device.

5. The method of claim 1, wherein the resource information comprises 12 bits including a link ID of 6 bits, a slot start point of 4 bits, and a resource allocation demand amount of 4 bits.

6. A reception device configuring a target link corresponding to one of a plurality of links in a communication network and performing distributed scheduling for allocating resources to be used for transmitting data through a session in the configured target link, the reception device comprising:
a receiver configured to receive resource information broadcasted by a counterpart transmission device configuring the target link and one or more adjacent transmission devices;
a controller configured to:
adjust self-resource information in consideration of resource position information included in the broadcasted resource information and an added resource allocation demand amount,
add up resource allocation demand amounts included in the broadcasted resource information by a preset Resource Unit (RU), and
measure a channel quality by a pilot signal received from the counterpart transmission device until data transmission using resources determined based on a predetermined distributed scheduling rule of the broadcasted resource information is performed; and
a transmitter configured to transmit the adjusted resource information to the counterpart transmission device and feed back channel quality information according to the measurement to the counterpart transmission device.

7. The reception device of claim 6, wherein the broadcasted resource information includes link identification information, a resource allocation start position, and a resource allocation demand amount.

8. The reception device of claim 7, wherein the adjusted resource information includes at least one of an adjusted resource allocation start position, an adjusted resource allocation demand amount, or link identification information.

9. The reception device of claim 6, wherein the receiver is configured to transmit a response signal according to a reception of data transmitted from the counterpart transmission device and an additional resource bit indicating whether there are resources left in all resources corresponding to the resource allocation demand amount included in the adjusted resource information to the counterpart transmission device by a control of the controller.

10. The reception device of claim 6, wherein the resource information comprises 12 bits including a link ID of 6 bits, a slot start point of 4 bits, and a resource allocation demand amount of 4 bits.

11. A method of performing distributed scheduling by a transmission device configuring a target link corresponding to one of a plurality of links in a communication network, the method comprising:
broadcasting resource information configured for the target link;
receiving resource information adjusted by a counterpart reception device configuring the target link;
transmitting a pilot signal and data based on the resource information configured for the target link;
receiving channel quality information corresponding to the transmitted pilot signal from the counterpart reception device;
when data transmission using allocated resources is completed, determining a resource allocation demand amount for a next device to device communication in consideration of the received channel quality information;

when the data transmission using the allocated resources is completed, updating a resource allocation start position for the next device to device communication by the received adjusted resource information; and broadcasting resource information including the determined resource allocation demand amount, the updated resource allocation start position, and identification information of a link for performing the next device to device communication.

12. The method of claim 11, wherein the resource information configured for the target link includes identification information for identifying the target link, a resource allocation start position, and a resource allocation demand amount randomly determined when a session starts.

13. The method of claim 12, wherein the adjusted resource information includes at least one of an adjusted resource allocation start position, an adjusted resource allocation demand amount, or link identification information.

14. The method of claim 11, further comprising receiving a response signal according to a reception of data transmitted from the counterpart reception device and an additional resource bit indicating whether there are resources left in all resources corresponding to the resource allocation demand amount included in the adjusted resource information from the counterpart reception device.

15. The method of claim 11, wherein the resource information comprises 12 bits including a link ID of 6 bits, a slot start point of 4 bits, and a resource allocation demand amount of 4 bits.

16. A transmission device configuring a target link corresponding to one of a plurality of links in a communication network and performing distributed scheduling for allocating resources to be used for transmitting data through a session in the configured target link, the transmission device comprising:

a transmitter configured to:
broadcast resource information configured for the target link, and
transmit a pilot signal and data based on the resource information configured for the target link;

a receiver configured to:
receive resource information adjusted by a counterpart reception device configuring the target link, and
receive channel quality information corresponding to the transmitted pilot signal from the counterpart reception device; and a controller that, when data transmission using allocated resources is completed, is configured to:
determine a resource allocation demand amount for a next device to device communication in consideration of the received channel quality information,
update a resource allocation start position for the next device to device communication by the received adjusted resource information, and
broadcast resource information including the determined resource allocation demand amount, the updated resource allocation start position, and identification information of a link for performing the next device to device communication.

17. The transmission device of claim 16, wherein the resource information configured for the target link includes identification information for identifying the target link, a resource allocation start position, and a resource allocation demand amount randomly determined when a session starts.

18. The transmission device of claim 17, wherein the adjusted resource information includes at least one of an adjusted resource allocation start position, an adjusted resource allocation demand amount, or link identification information.

19. The transmission device of claim 17, wherein the receiver is configured to receive a response signal according to a reception of data transmitted from the counterpart reception device and an additional resource bit indicating whether there are resources left in all resources corresponding to the resource allocation demand amount included in the adjusted resource information from the counterpart reception device.

20. The transmission device of claim 16, wherein the resource information comprises 12 bits including a link ID of 6 bits, a slot start point of 4 bits, and a resource allocation demand amount of 4 bits.

* * * * *